(12) United States Patent
Iwamoto

(10) Patent No.: US 12,204,080 B2
(45) Date of Patent: Jan. 21, 2025

(54) ZOOM LENS

(71) Applicant: CANON KABUSHIKI KAISHA, Tokyo (JP)

(72) Inventor: Shunji Iwamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/499,948

(22) Filed: Nov. 1, 2023

(65) Prior Publication Data
US 2024/0061225 A1  Feb. 22, 2024

Related U.S. Application Data

(63) Continuation of application No. 17/381,872, filed on Jul. 21, 2021, now Pat. No. 11,860,348.

(30) Foreign Application Priority Data

Jul. 31, 2020  (JP) ................. 2020-129834

(51) Int. Cl.
*G02B 15/20* (2006.01)
*G02B 15/14* (2006.01)
*G02B 27/00* (2006.01)

(52) U.S. Cl.
CPC ..... *G02B 15/20* (2013.01); *G02B 15/143105* (2019.08); *G02B 27/0025* (2013.01)

(58) Field of Classification Search
None
See application file for complete search history.

(56) References Cited

U.S. PATENT DOCUMENTS

| | | | | |
|---|---|---|---|---|
| 9,195,035 B2* | 11/2015 | Sanjo | ............... | G02B 15/167 |
| 9,904,043 B2* | 2/2018 | Shimomura | ........... | G02B 15/20 |
| 11,347,034 B2* | 5/2022 | Hori | .................. | G02B 15/173 |
| 2014/0320977 A1* | 10/2014 | Yakita | ............ | G02B 15/144109 |
| | | | | 359/686 |

FOREIGN PATENT DOCUMENTS

| | | |
|---|---|---|
| JP | H04191811 A | 7/1992 |
| JP | H09325274 A | 12/1997 |
| JP | 2007212830 A | 8/2007 |
| JP | 2012093548 A | 5/2012 |
| JP | 2016118737 A | 6/2016 |
| JP | 2019120773 A | 7/2019 |
| JP | 2021096331 A | 6/2021 |

* cited by examiner

*Primary Examiner* — Robert E. Tallman
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative power, and a rear unit having a positive refractive power as a whole and including one or more lens units. A distance between adjacent lens units changes during zooming. The first lens unit includes a first subunit having a positive refractive power and a second subunit disposed on the image side of the first subunit. The first subunit includes a first positive lens having the smallest absolute value of a focal length among lenses included in the first subunit. The second subunit includes a second positive lens and a first negative lens having the smallest absolute value of a focal length among negative lenses included in the second subunit. A predetermined condition is satisfied.

26 Claims, 15 Drawing Sheets

ZOOM LENS

CROSS-REFERENCE TO RELATED APPLICATION

This application is a Continuation of U.S. application Ser. No. 17/381,872, filed Jul. 21, 2021, which claims priority from Japanese Patent Application No. 2020-129834, filed on Jul. 31, 2020, which is hereby incorporated by reference herein in its entirety.

BACKGROUND OF THE DISCLOSURE

Field of the Disclosure

The aspect of the embodiments relates to a zoom lens suitable for a digital video camera, a digital still camera, a broadcasting camera, a film-based camera, a surveillance camera, and the like.

Description of the Related Art

One conventional zoom lens includes a lens unit that has a positive refractive power and is the closest to the object for a long focal length and a large aperture ratio (Japanese Patent Laid-Open Nos. (JPs) 2013-167749, 2019-120773, and 06-289296).

However, a zoom lens having a long focal length at a telephoto end and a small F-number results in a large front lens diameter and a heavy weight. The weight reduction is insufficient with the zoom lenses disclosed in JPs 2013-167749, 2019-120773, and 06-289296. It is effective to reduce the number of lenses for the weight reduction, but it becomes difficult to achieve a high image quality with the reduced number of lenses.

SUMMARY OF THE DISCLOSURE

A zoom lens according to one aspect of the embodiments includes, in order from an object side to an image side, a first lens unit having a positive refractive power, a second lens unit having a negative power, and a rear unit having a positive refractive power as a whole and including one or more lens units. A distance between adjacent lens units changes during zooming. The first lens unit includes a first subunit having a positive refractive power and a second subunit disposed on the image side of the first subunit. The first subunit includes a first positive lens. The second subunit includes a second positive lens and a first negative lens. The first positive lens is a lens having the smallest absolute value of a focal length among lenses included in the first subunit. The first negative lens is a lens having the smallest absolute value of a focal length among negative lenses included in the second subunit. The following inequalities are satisfied:

$$0.10 < d11/f11 < 0.50$$

$$0.6 < f11/f1 < 2.0$$

$$-8.0 < f1/f2 < -2.5$$

where d11 is a distance on an optical axis from the first subunit to the second subunit, f11 is a focal length of the first subunit, f1 is a focal length of the first lens unit, and f2 is a focal length of the second lens unit.

An image pickup apparatus having the above zoom lens also constitutes another aspect of the embodiments.

Further features of the disclosure will become apparent from the following description of exemplary embodiments with reference to the attached drawings.

DESCRIPTION OF THE EMBODIMENTS

Figure 1:
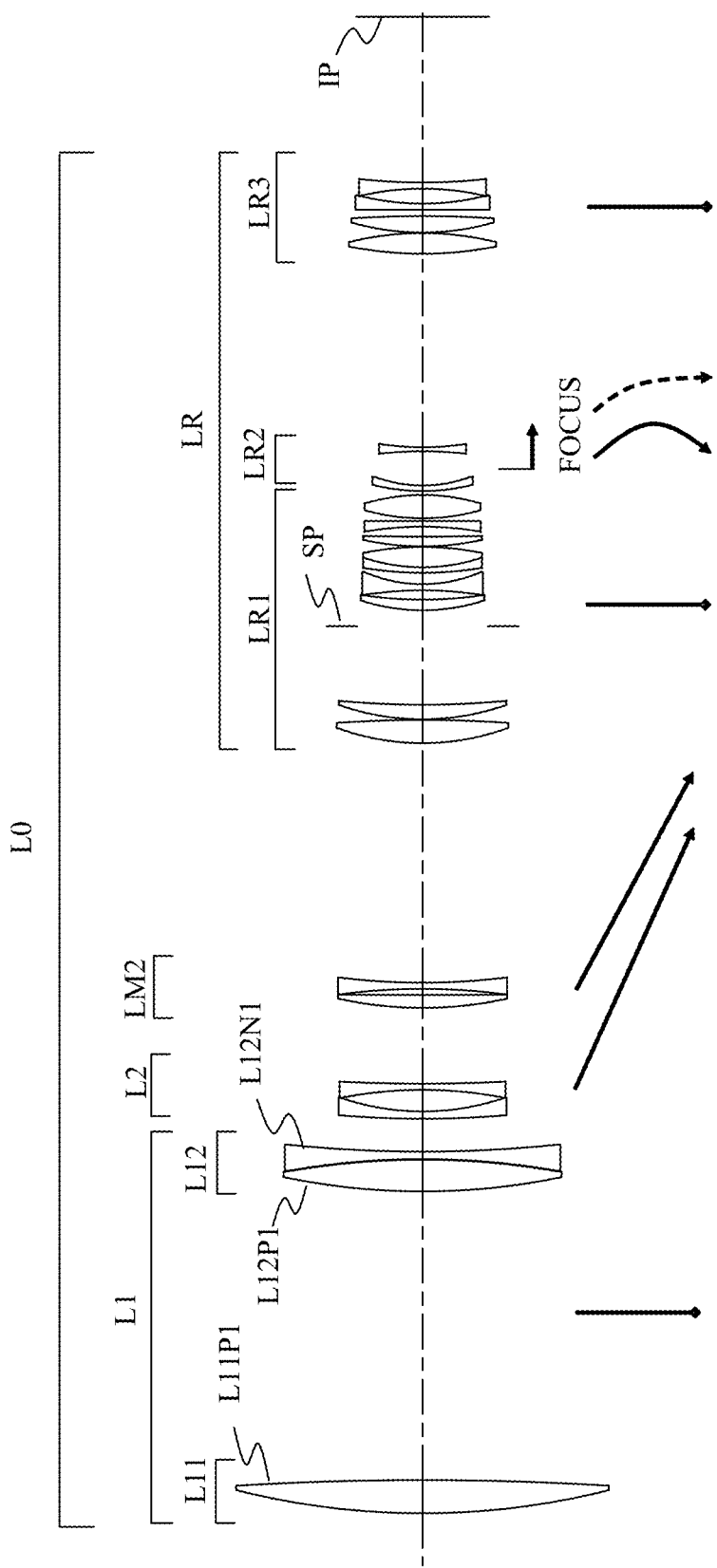
FIG. 1 is a sectional view of a zoom lens according to Example 1 in an in-focus state at infinity.
Figure 2:
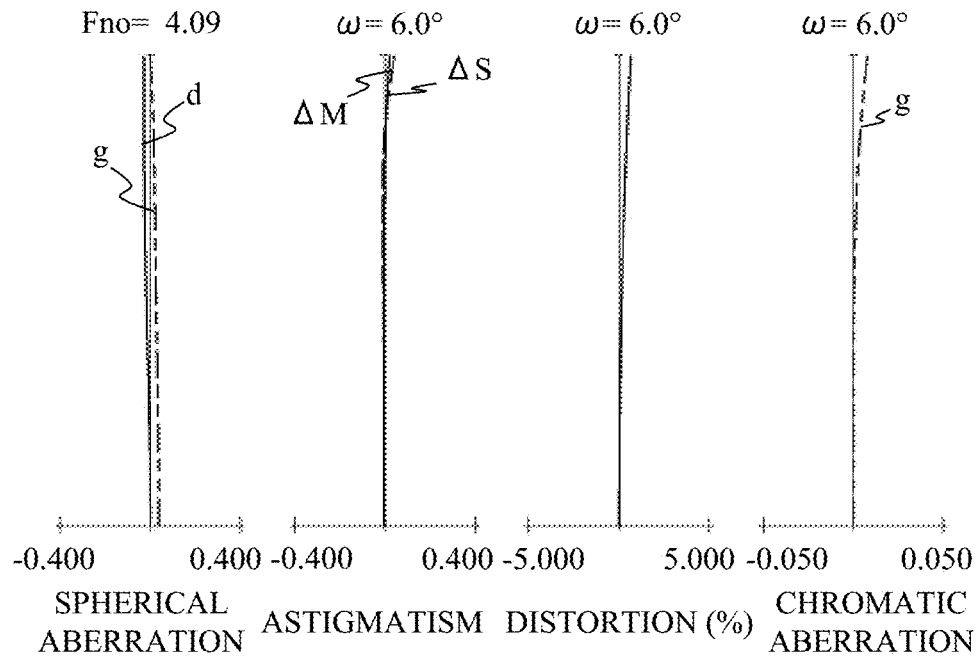
FIG. 2 is an aberration diagram of the zoom lens according to Example 1 in the in-focus state at infinity.
Figure 2:
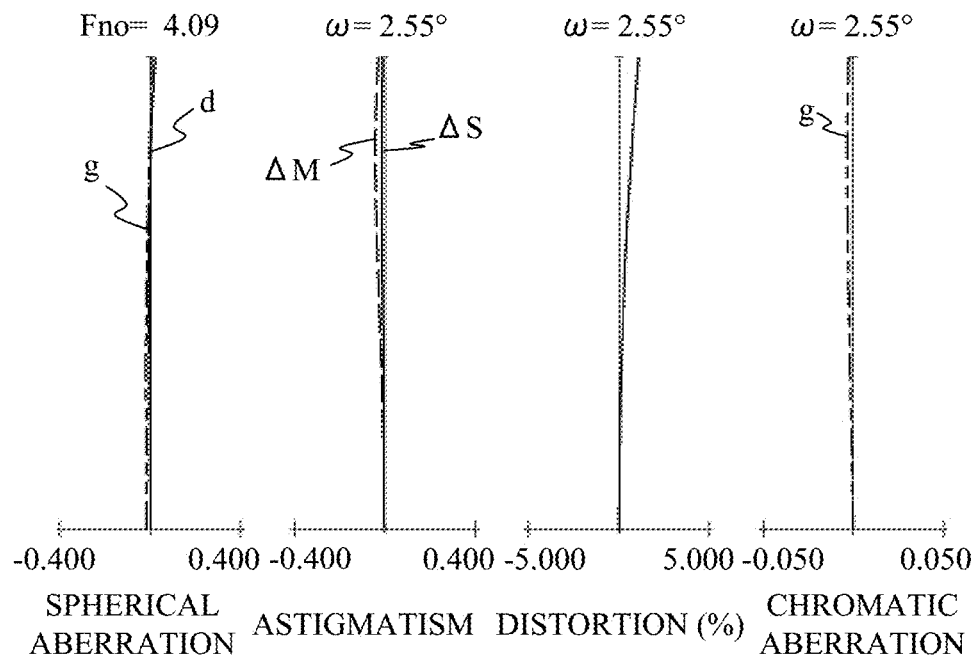
Figure 3:
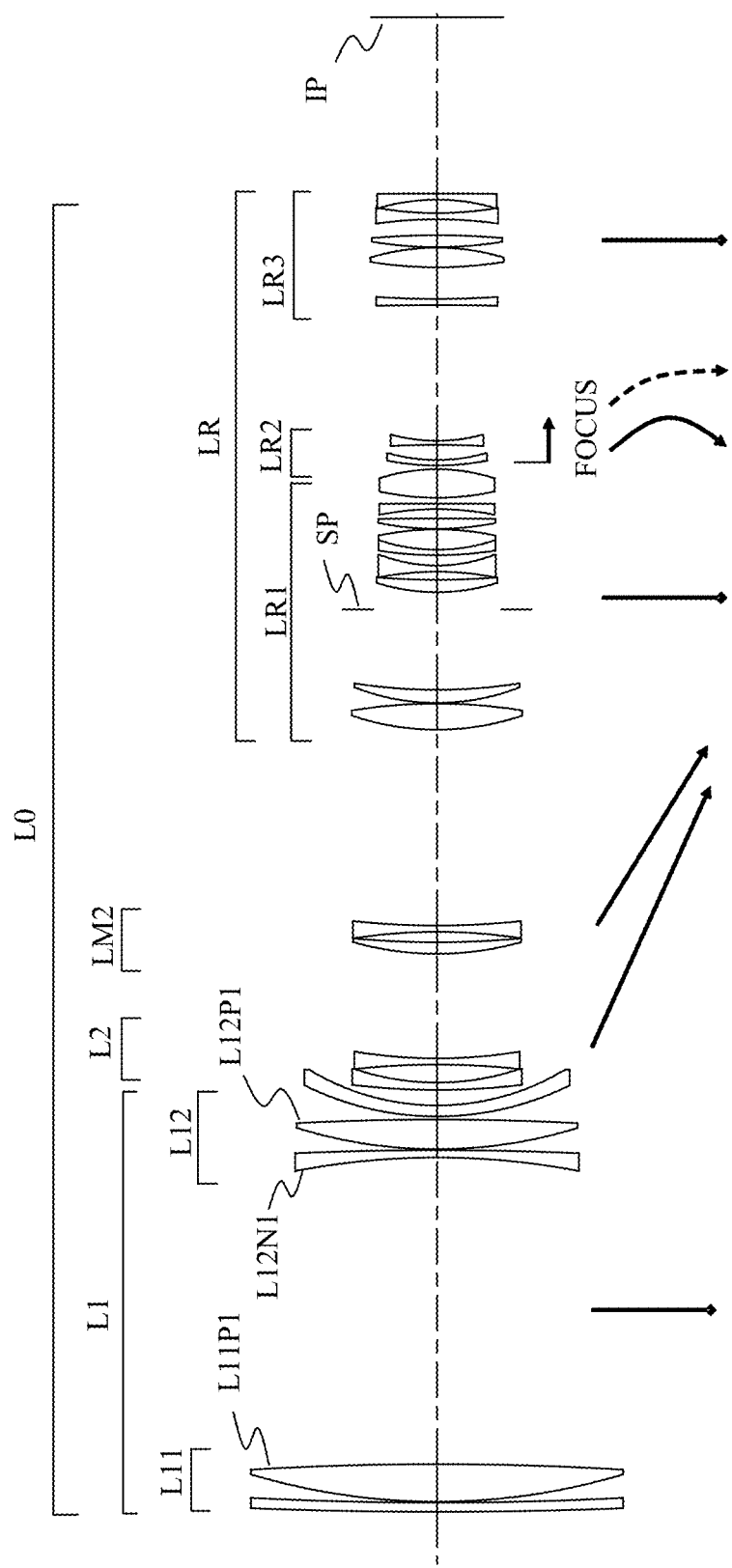
FIG. 3 is a sectional view of a zoom lens according to Example 2 in an in-focus state at infinity.
Figure 4:
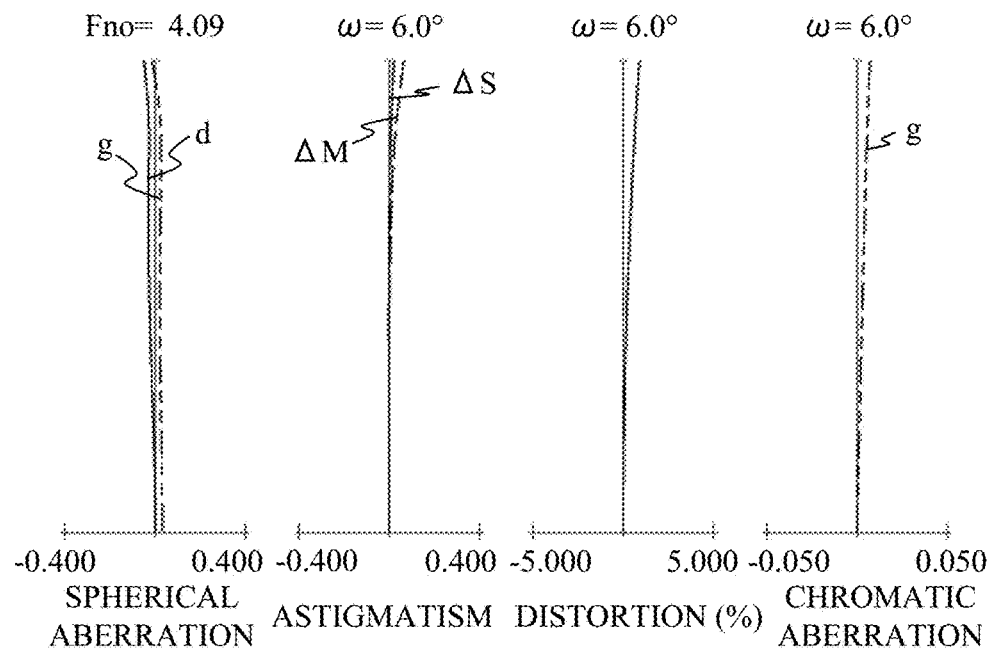
FIG. 4 is an aberration diagram of a zoom lens according to Example 2 in the in-focus state at infinity.
Figure 4:
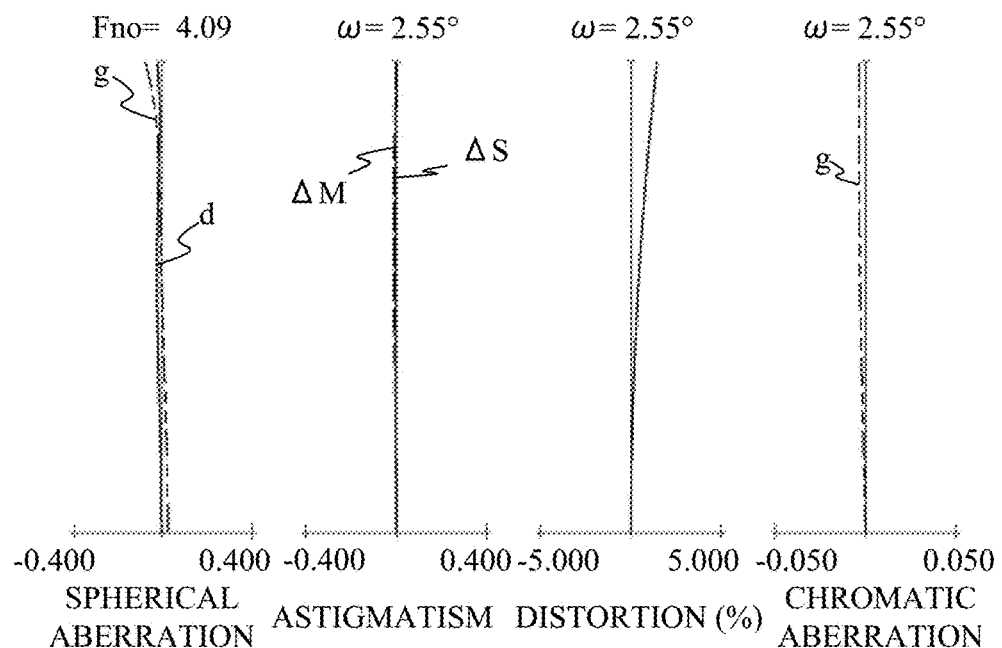
Figure 5:
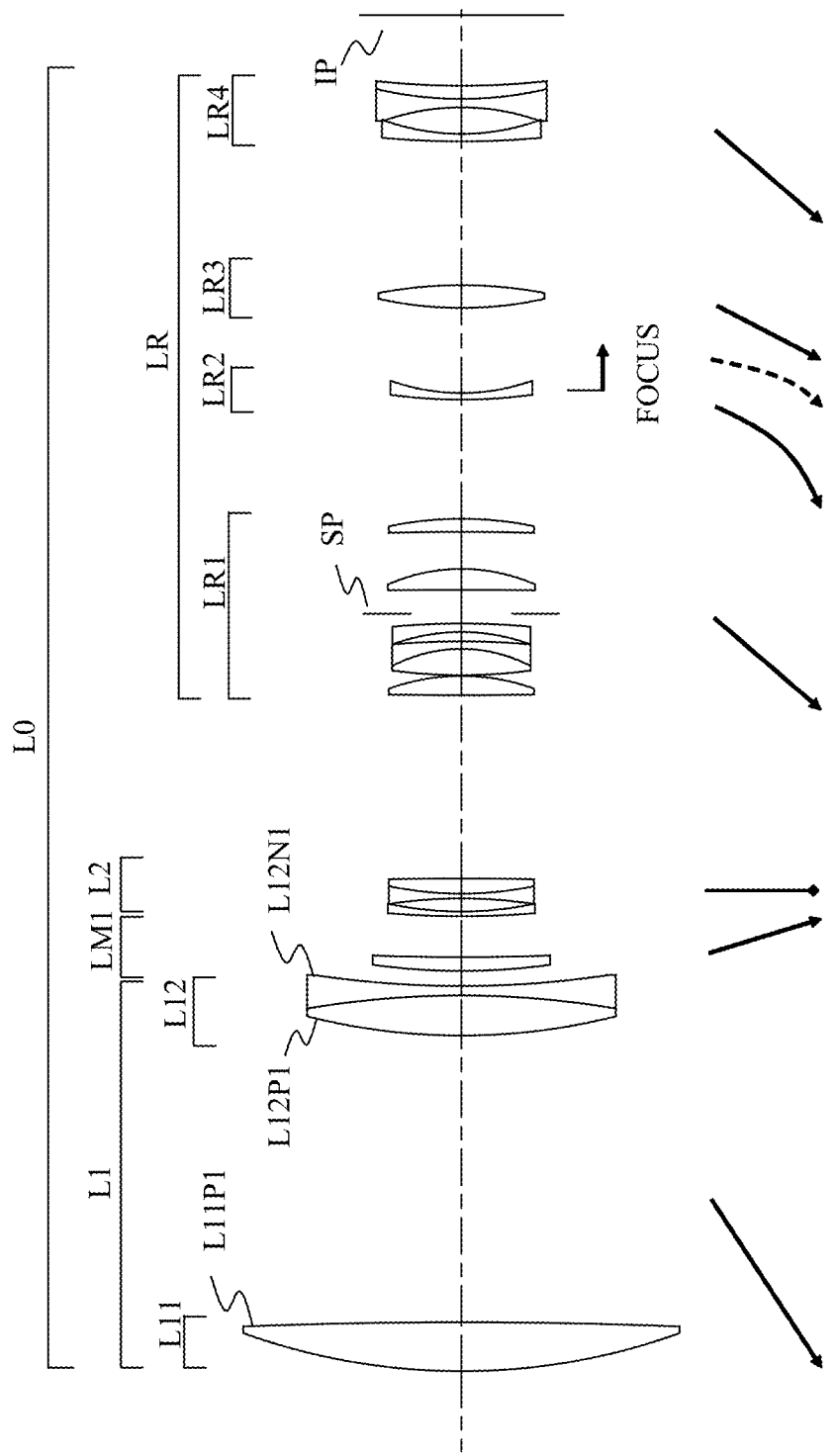
FIG. 5 is a sectional view of a zoom lens according to Example 3 in an in-focus state at infinity.
Figure 6:
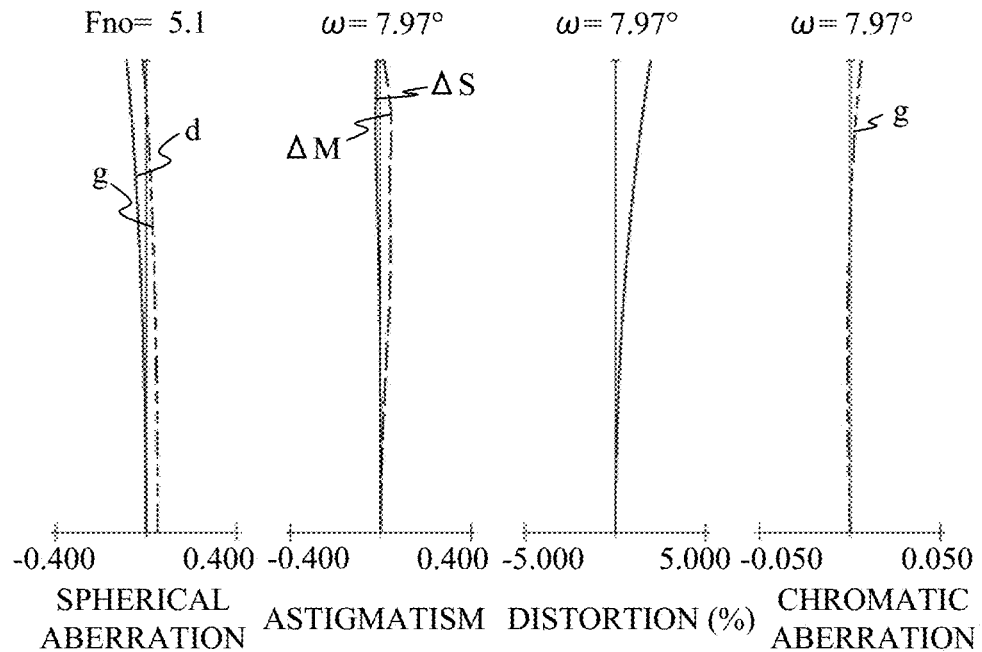
FIG. 6 is an aberration diagram of the zoom lens according to Example 3 in the in-focus state at infinity.
Figure 6:
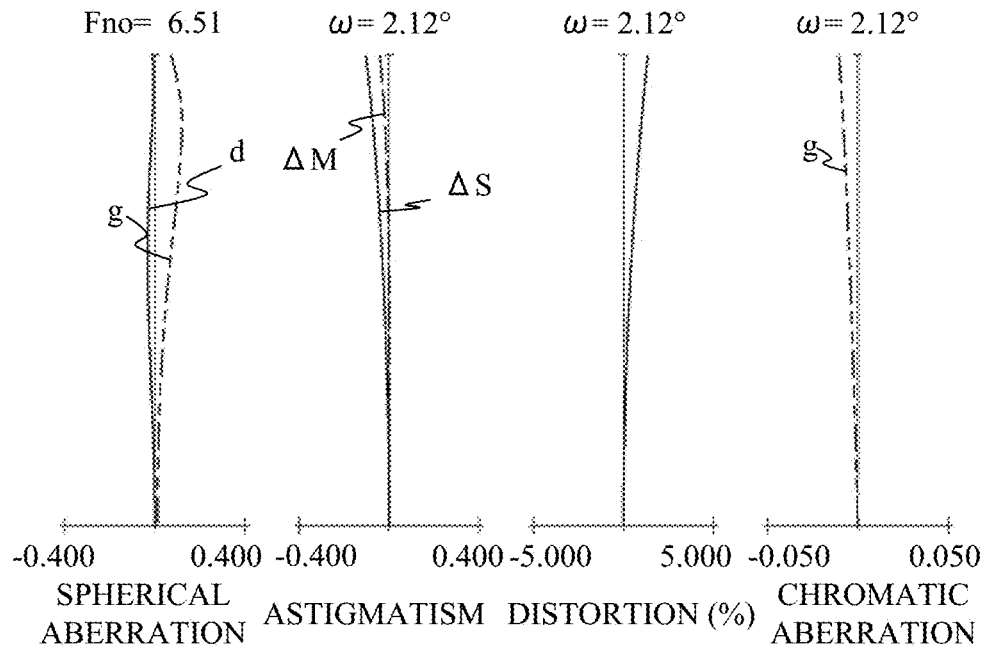
Figure 7:
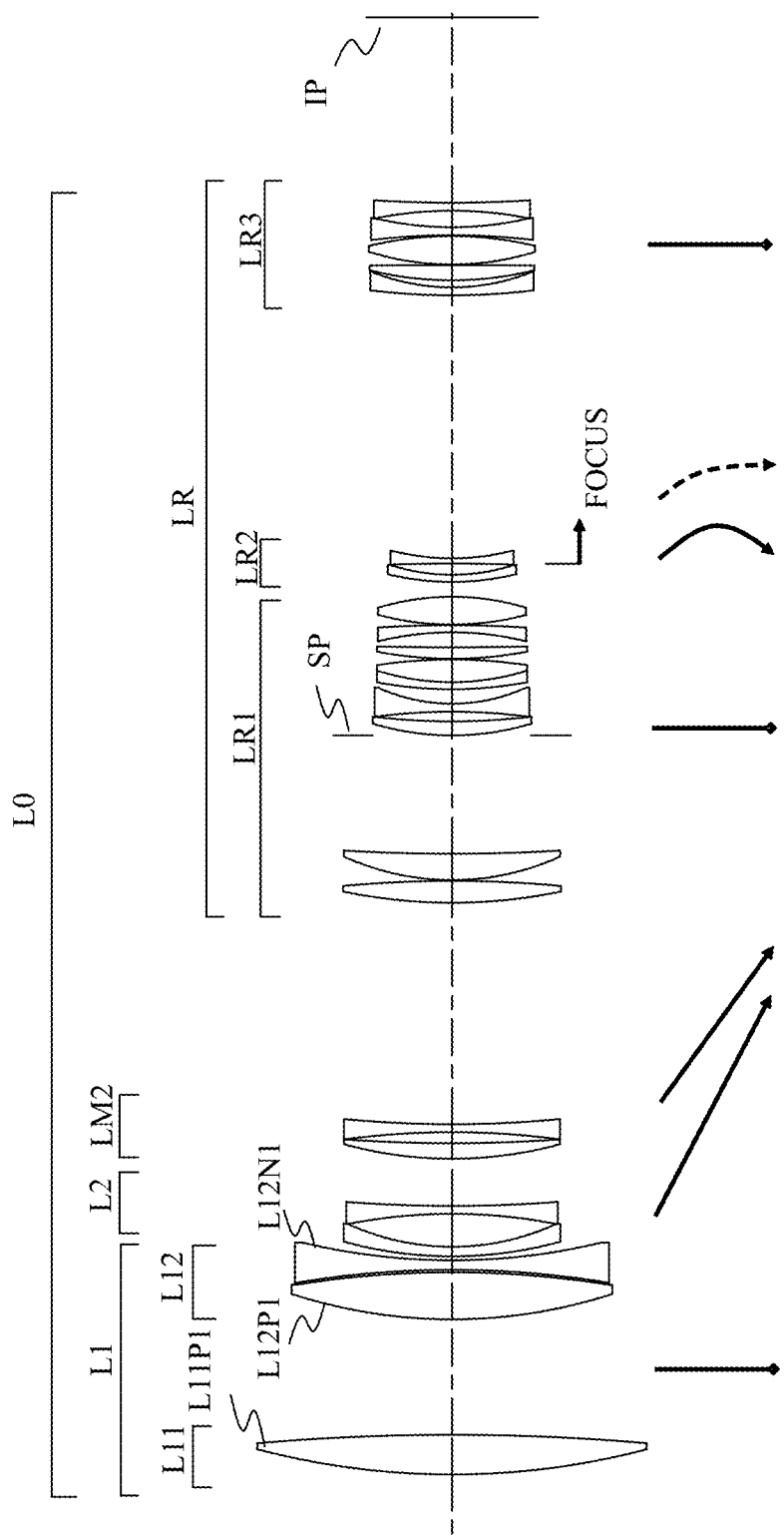
FIG. 7 is a sectional view of a zoom lens according to Example 4 in an in-focus state at infinity.
Figure 8:
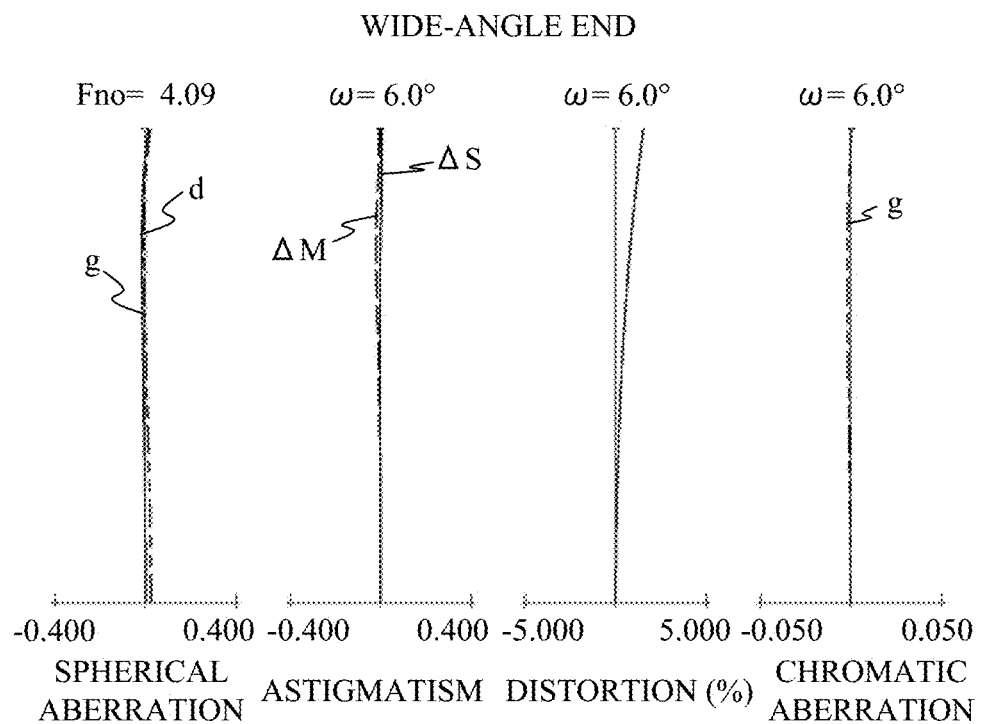
FIG. 8 is an aberration diagram of a zoom lens according to Example 4 in the in-focus state at infinity.
Figure 8:
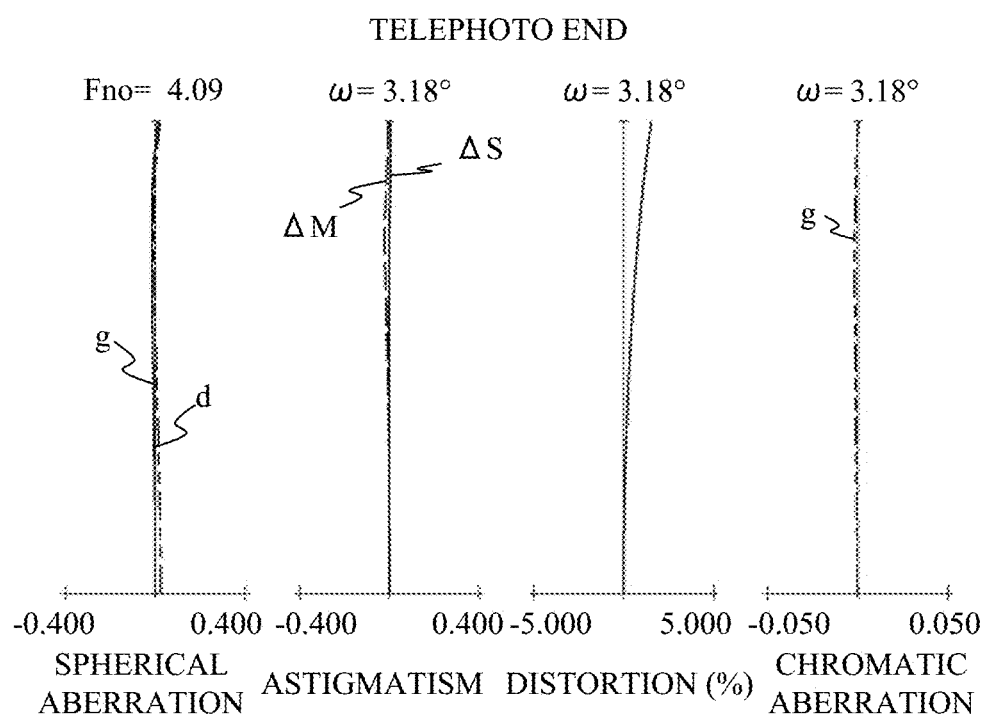
Figure 9:
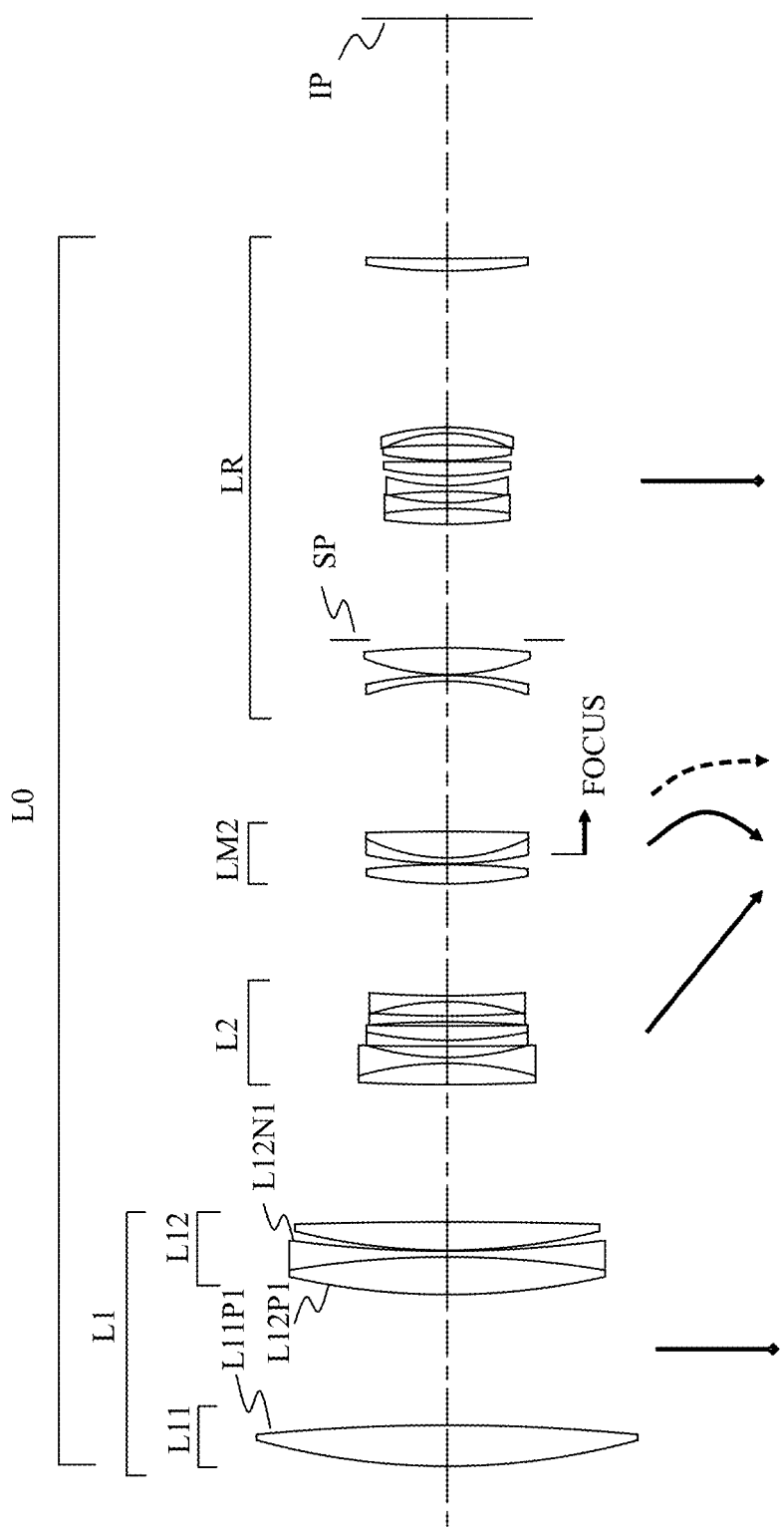
FIG. 9 is a sectional view of a zoom lens according to Example 5 in an in-focus state at infinity.
Figure 10:
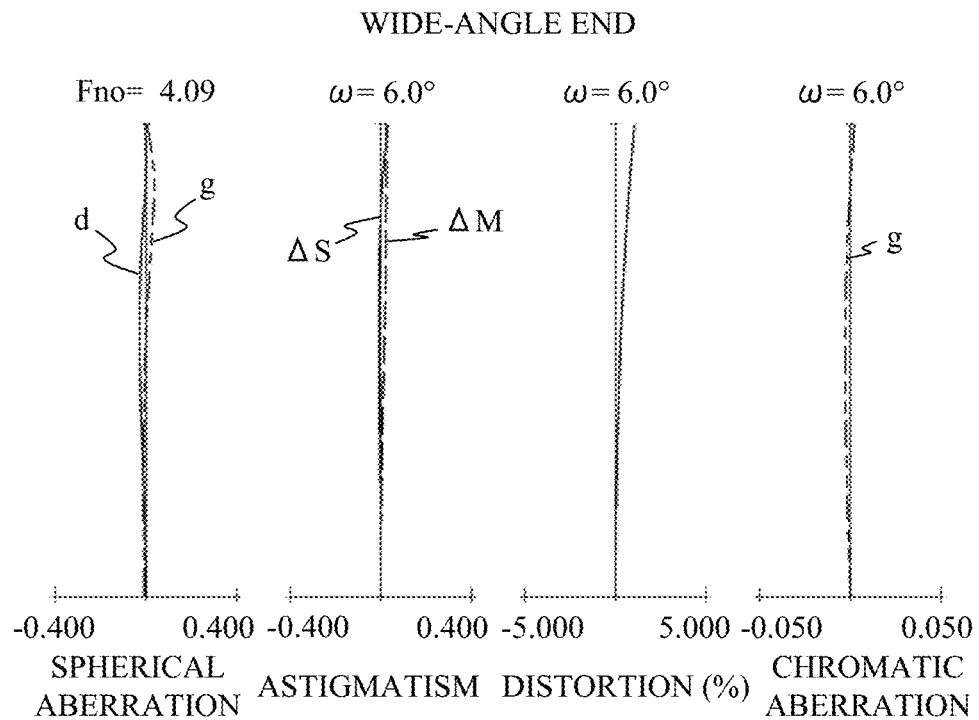
FIG. 10 is an aberration diagram of the zoom lens according to Example 5 in the in-focus state at infinity.
Figure 10:
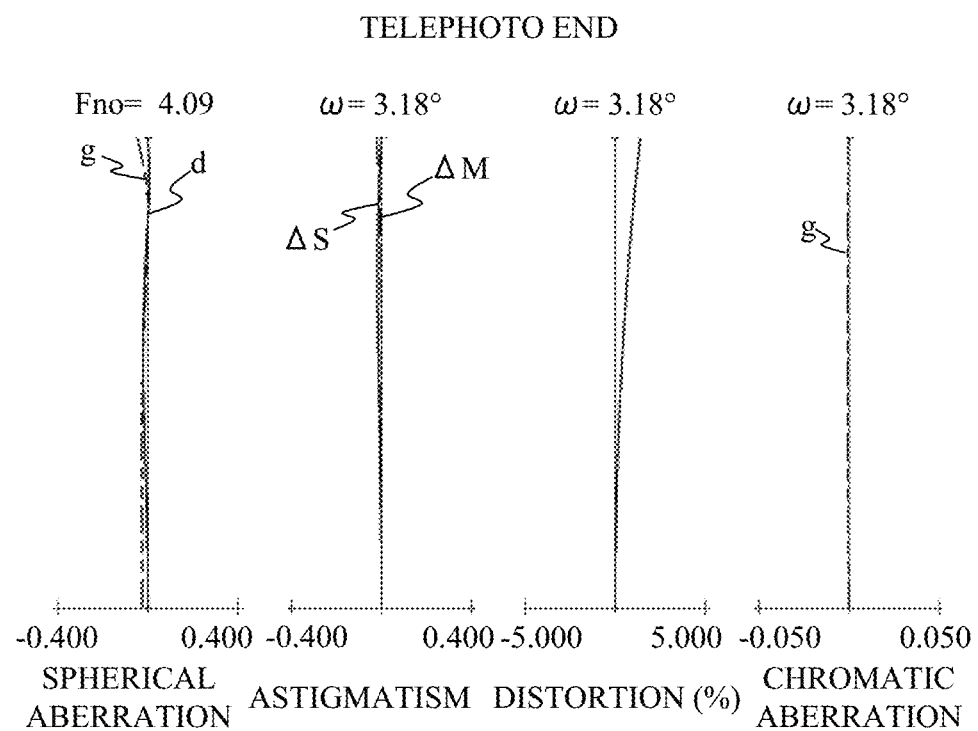
Figure 11:
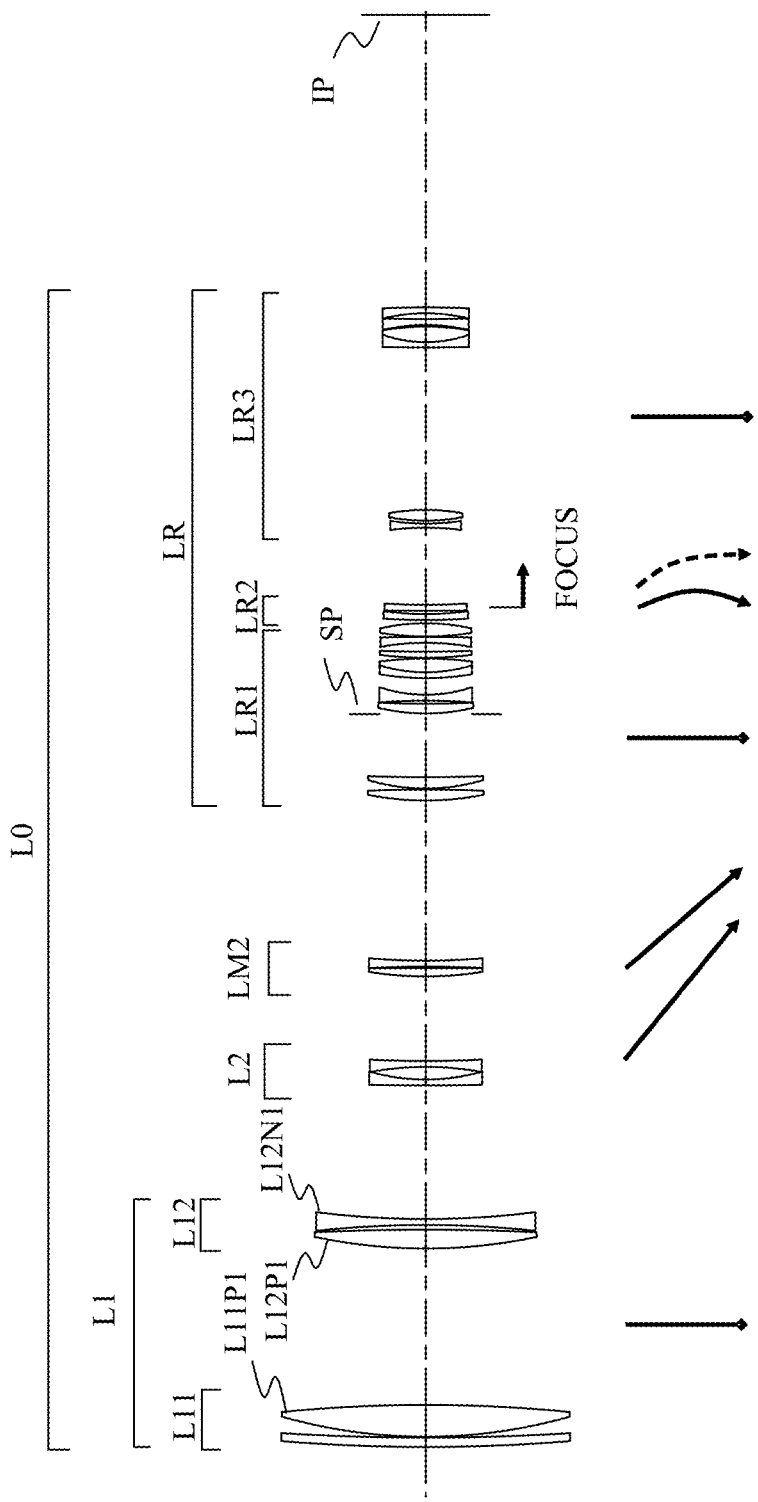
FIG. 11 is a sectional view of a zoom lens according to Example 6 in an in-focus state at infinity.
Figure 12:
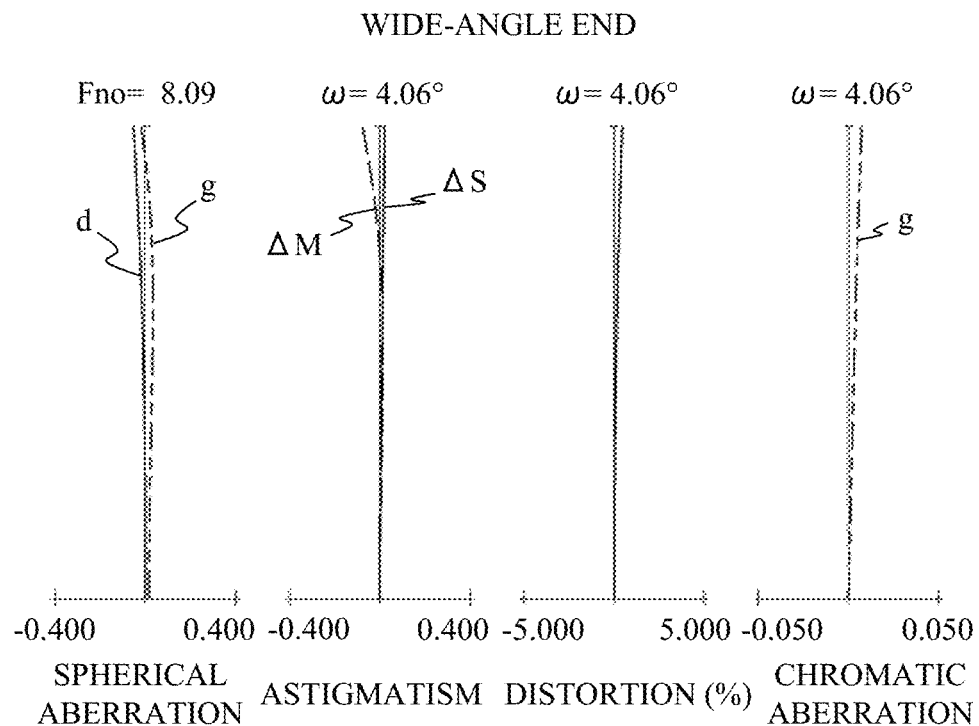
FIG. 12 is an aberration diagram of the zoom lens according to Example 6 in an in-focus at infinity.
Figure 12:
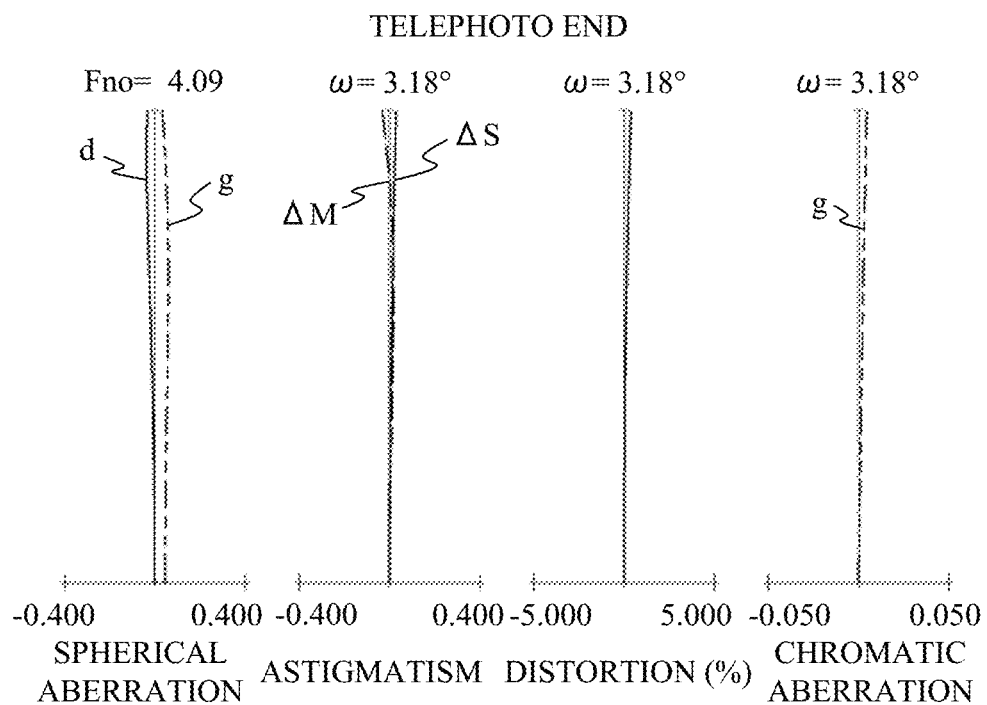
Figure 13:
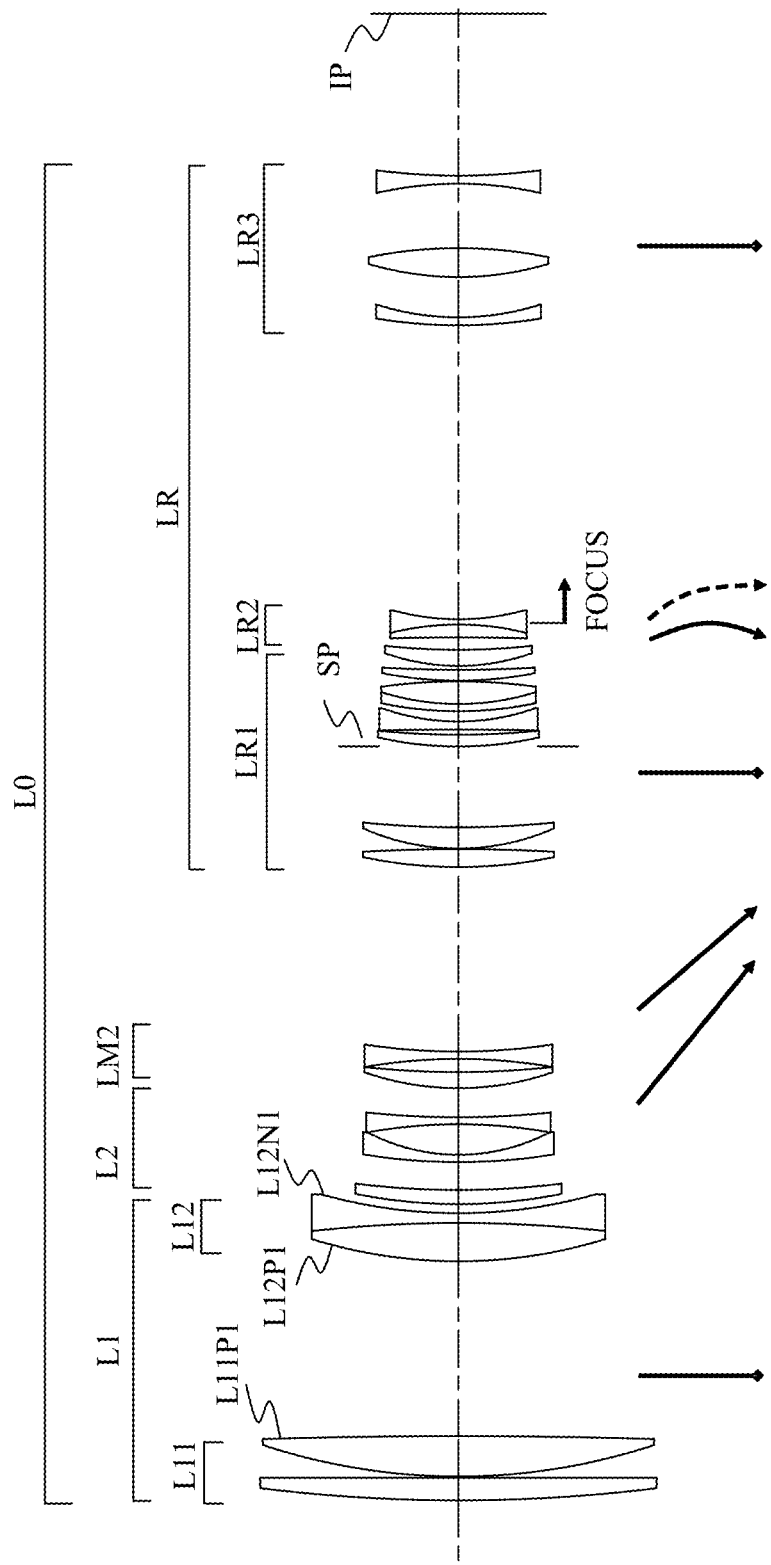
FIG. 13 is a sectional view of a zoom lens according to Example 7 in an in-focus state at infinity.
Figure 14:
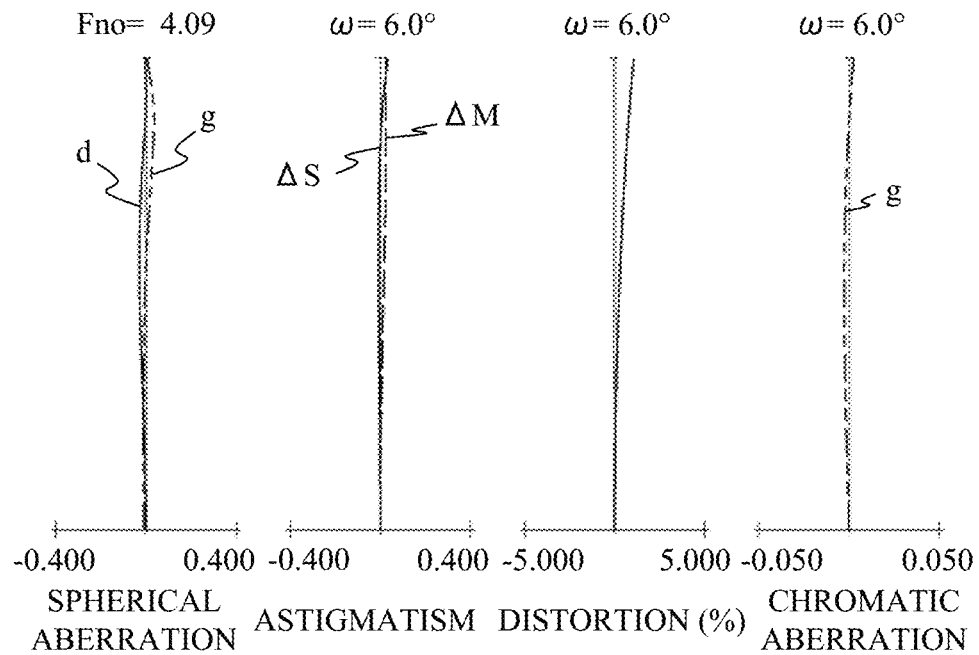
FIG. 14 is an aberration diagram of the zoom lens according to Example 7 in the in-focus state at infinity.
Figure 14:
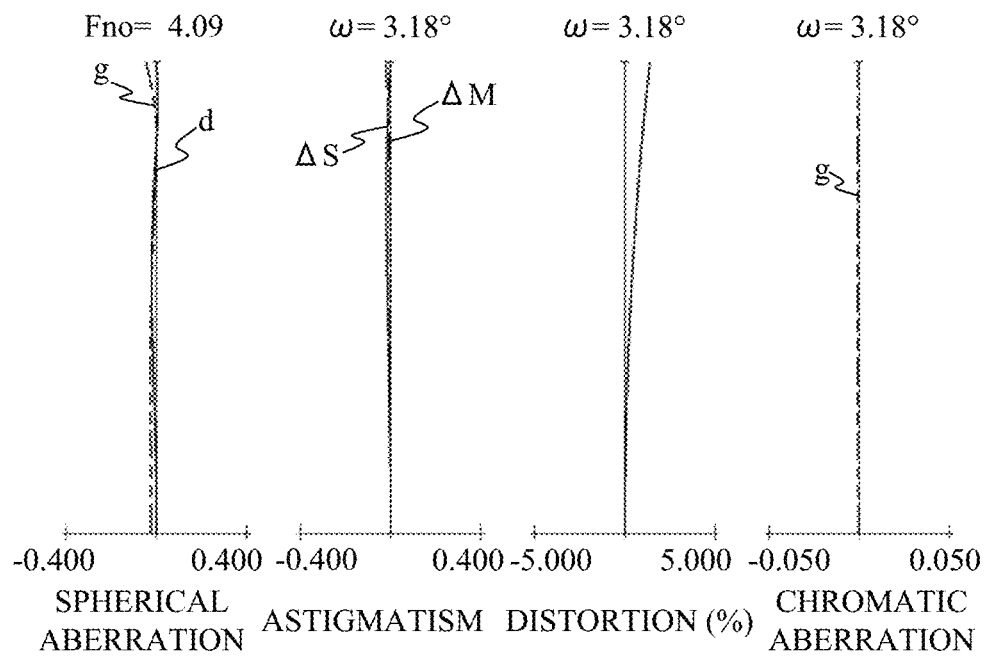

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, 9, 11 and 13 are sectional views of zoom lenses according to Examples 1 to 7 in an in-focus state at infinity, respectively. The zoom lens according to each example is used for an image pickup apparatus, such as a digital video camera, a digital still camera, a broadcasting camera, a film-based camera, and a surveillance camera.

In each sectional view, the left side is an object side and the right side is an image side. The zoom lens according to each example includes a plurality of lens units. In this specification, a lens unit is a group of lenses that integrally move or stand still during zooming. That is, in the zoom lenses according to each example, a distance between adjacent lens units changes during zooming. Arrows shown in each sectional view indicate moving directions of the lens units during zooming from a wide-angle end to a telephoto end and focusing from an object at infinity (infinity object) to the closest object. The lens unit may include a single lens or a plurality of lenses. The lens unit may include a diaphragm (aperture stop).

The zoom lens L0 according to each example includes, in order from the object side to the image side, a first lens unit L1 having a positive refractive power, a second lens unit L2 having a negative refractive power, and a rear unit LR having a positive refractive power and including one or more lens units. In the zoom lens L0 according to each example, a distance between adjacent lens units changes during zooming. The lens unit that has a positive refractive power and is closest to the object easily enables a so-called telephoto type power arrangement, which is advantageous for a long focal length scheme.

SP represents a diaphragm (aperture stop) that determines (limits) a light beam of the open F-number (Fno). IP represents an image plane. When the zoom lens according to each example is used as an imaging optical system for a digital still camera or a digital video camera, an imaging plane of a solid-state image sensor (photoelectric conversion element) such as a CCD sensor or a CMOS sensor is placed on the image plane IP. When the zoom lens according to each example is used as an imaging optical system of a film-based camera, a photosensitive plane corresponding to a film plane is placed on the image plane IP.

FIGS. 2, 4, 6, 8, 10, 12, and 14 are aberration diagrams of the zoom lenses L0 according to Examples 1 to 7, respectively, in the in-focus state at infinity. In the spherical aberration diagram, Fno represents an F-number. The spherical aberration diagram shows spherical aberration amounts for the d-line (wavelength 587.6 nm) and the g-line (wavelength 435.8 nm). In the astigmatism diagram, $\Delta S$ indicates an astigmatism amount on a sagittal image plane, and $\Delta M$ indicates an astigmatism amount on a meridional image plane. The distortion diagram shows a distortion amount for the d-line. The chromatic aberration diagram shows a chromatic aberration amount for the g-line. $\omega$ is the half-angle of view (°) taken by a paraxial calculation.

Next follows a description of the characteristic configuration of the zoom lens L0 according to each example.

For a compact and lightweight zoom lens L0 having a long focal length, a large aperture ratio, and a high image quality, it is important to properly determine the layout and shape of the lens disposed on the object side which has a diameter that is likely to increase. In particular, the configuration of the first lens unit L1 closest to the object is very important.

In the zoom lens L0 according to each example, the first lens unit L1 includes, in order from the object side to the image side, a first subunit L11 having a positive refractive power and a second subunit L12. The first subunit L11 has a first positive lens L11P1. The second subunit L12 has a second positive lens L12P1 and a first negative lens L12N1. The first positive lens L11P1 is a lens having the smallest absolute value of a focal length among lenses included in the first subunit L11. The first negative lens L12N1 is a lens having the smallest absolute value of a focal length among negative lenses included in the second subunit L12. The first lens unit L1 closest to the object is divided into a first subunit L11 having a positive refractive power and a second subunit L12 having a positive or negative refractive power, and a telephoto type configuration is assigned to the first lens unit L1. This configuration is advantageous for the long focal length scheme. When the second subunit L12 includes at least one positive lens and at least one negative lens, various aberrations are easily correctable.

The zoom lens L0 according to each example satisfies the following inequalities (1) to (3):

$$0.08 < d11/f11 < 0.50 \quad (1)$$

$$0.6 < f11/f1 < 2.0 \quad (2)$$

$$-8.0 < f1/f2 < -2.0 \quad (3)$$

Here, d11 is a distance on the optical axis from a lens surface closest to the image plane of the first subunit L11 to a lens surface closest to the object of the second subunit L12 (i.e., distance on the optical axis of from the first subunit L11 to the second subunit L12). f11 is a focal length of the first subunit L11. f1 is a focal length of the first lens unit L1. f2 is a focal length of the second lens unit L2.

The inequality (1) defines a ratio of the distance between the first subunit L11 and the second subunit L12 to the focal length of the first subunit L11. The diameter of the second subunit L12 can be reduced by converging the axial light beam with the first subunit L11 having a positive refractive power and by disposing the second subunit L12 with proper air spacing, and thus the weight can be easily reduced. If the distance between the first subunit L11 and the second subunit L12 is longer beyond the upper limit in the inequality (1), the overall lens length becomes long and a compact structure becomes difficult. If the distance between the first subunit L11 and the second subunit L12 is shorter beyond the lower limit in the inequality (1), the diameter reduction becomes insufficient and the weight reduction becomes difficult.

The inequality (2) defines a ratio of the focal length of the first subunit L11 to the focal length of the first lens unit L1. If the focal length f11 of the first subunit L11 becomes longer beyond the upper limit in the inequality (2), the entire telephoto power arrangement and consequently a smaller overall lens length become difficult. If the focal length f11 of the first subunit L11 becomes shorter beyond the lower limit in the inequality (2), it becomes difficult to correct the aberrations generated in the first subunit L11, particularly the longitudinal and lateral chromatic aberrations.

The inequality (3) defines a ratio of the focal length of the first lens unit L1 to the focal length of the second lens unit L2. If the focal length f1 of the first lens unit L1 becomes shorter beyond the upper limit in the inequality (3), it becomes difficult to correct the aberrations generated in the first lens unit L1, especially the longitudinal and lateral chromatic aberrations. When the absolute value of the focal length f2 of the second lens unit L2 becomes smaller beyond the lower limit in the inequality (3), it becomes difficult to correct the aberrations generated in the second lens unit L2, especially the zoom fluctuation of the spherical aberration and the zoom fluctuation of the astigmatism.

The numerical ranges of the inequalities (1) to (3) may be set to those of the following inequalities (1a) to (3a):

$$0.10 < d11/f11 < 0.35 \quad (1a)$$

$$0.7 < f11/f1 < 1.5 \quad (2a)$$

$$-5.5 < f1/f2 < -2.5 \quad (3a)$$

The numerical ranges of the inequalities (1) to (3) may be set to those of the following inequalities (1b) to (3b):

$$0.11 < d11/f11 < 0.26 \quad (1b)$$

$$0.74 < f1 < 1.30 \quad (2b)$$

$$-5.0 < f1/f2 < -3.0 \quad (3b)$$

Next follows a description of the configuration that may be satisfied by the zoom lens L0 according to each example.

The zoom lens L0 according to each example may make immovable (fix) the first lens unit L1 relative to the image plane during focusing. During focusing, the focus lens unit L1 disposed on the object side may be made immovable relative to the image plane which has a diameter that is likely to be large, and focusing is made with part of the subsequent units having small diameters. This configuration can easily achieve the weight reduction of the focus lens unit.

In the zoom lens L0 according to each example, the first subunit L11 consists of a first positive lens L11P1 or a first positive lens L11P1 and a lens having a positive or negative refractive power arranged in this order arranged from the object side to the image side. Since the first subunit L11 is a lens unit closest to the object, the lens diameter and the weight are likely to be large. It is thus important to make the number of lenses in the first subunit L11 as small as possible. This configuration can easily achieve the weight reduction of the first subunit L11. A protective glass or the like having substantially no power may be disposed on the object side of the first positive lens L11P1.

In the zoom lens L0 according to each example, the second subunit L2 may include three lenses or less including a positive lens and a negative lens. When the positive lens and the negative lens in the second subunit L12 which has a diameter smaller than that of the first subunit L11 serve to correct the aberrations, both the high image quality and the weight reduction can be promoted.

Next follows a description of conditions that may be satisfied by the zoom lens L0 according to each example. The zoom lens L0 according to each example may satisfy one or more of the following inequalities (4) to (14):

$$0.9 < \Sigma f11/|f11i| < 1.2 \quad (4)$$

$$0.1 < (r2+r1)/(r2-r1) < 2.0 \quad (5)$$

$$0.3 < (D1t - D1w)/21 < 2.0 \quad (6)$$

$$0.39 < Lt/ft < 1.20 \quad (7)$$

$$0.2 < (T1 + D1t)/ft < 0.9 \quad (8)$$

$$0.10 < (T1 + D1w)/fw < 0.95 \quad (9)$$

$$0.25 < f1/ft < 1.20 \quad (10)$$

$$-5.0 < \beta 2w < -0.1 \quad (11)$$

$$60 < vL11P1 < 100 \quad (12)$$

$$30 < vL12N1 < 60 \quad (13)$$

$$0.3 < d11/T1 < 1.2 \quad (14)$$

Here, f11i is a focal length of an i-th lens counted from the object side of the first subunit L11, where "i" is a natural number. r1 is a radius of curvature of a surface on the object side of the object of the first positive lens L11P1. r2 is a radius of curvature of a surface on the image side of the first positive lens L11P1. D1t is a distance on the optical axis from a lens surface closest to the image plane of the first lens unit L1 to a lens surface closest to the object of the second lens unit L2 at the telephoto end (i.e., distance on the optical axis from the first lens unit L1 to the second lens unit L2 at the telephoto end). D1w is a distance on the optical axis from a lens surface closest to the image plane of the first lens unit L1 to a lens surface closest to the object of the second lens unit L2 at the wide-angle end (i.e., distance on the optical axis from the first lens unit L1 to the second lens unit L2 at the wide-angle end). Lt is a distance on the optical axis from the lens plane closest to the object of the first lens unit L1 to the image plane at the telephoto end. ft is a focal length of the zoom lens L0 at the telephoto end. T1 is a distance on the optical axis from a lens surface closest to the object of the first lens unit L1 to a lens surface closest to the image plane of the first lens unit L1. fw is a focal length of the zoom lens L0 at the wide-angle end. $\beta 2w$ is an imaging lateral magnification of the second lens unit L2 at the wide-angle end. vL11P1 is an Abbe number of the first positive lens L11P1 for the d-line. vL12N1 is an Abbe number of the first negative lens L12N1 for the d-line.

The inequality (4) defines a ratio of the focal length of the first subunit L11 to the focal length of the lenses in the first subunit L11. When the absolute value of the focal length f11i of the lenses in the first subunit L11 becomes smaller beyond the upper limit in the inequality (4), the power of each lens becomes so strong that the weight of the first subunit L11 increases. If the absolute value of the focal length f11i of the lenses in the first subunit L11 relative to the focal length f11 of the first subunit L11 becomes larger beyond the lower limit in the inequality (4), the principal point position becomes unstable and it becomes difficult to properly correct the aberrations.

The inequality (5) defines a shape of the first positive lens L11P1. If the absolute value of the radius of curvature r1 of the surface on the object side of the first positive lens L11P1 becomes smaller beyond the upper limit in the inequality (5), it becomes difficult to correct the spherical aberration. If the absolute value of the radius of curvature radius r2 on the image side of the first positive lens L11P1 becomes smaller beyond the lower limit in the inequality (5), it becomes difficult to shorten the overall lens length.

The inequality (6) defines a ratio of a changing amount of the distance between the first lens unit L1 and the second lens unit L2 to the absolute value of the focal length f2 of the second lens unit L2. If the changing amount of the distance between the first lens unit L1 and the second lens unit L2 becomes large beyond the upper limit in the inequality (6), the zoom mechanism becomes complicated and weight reduction becomes difficult. If the changing amount of the distance between the first lens unit L1 and the second lens unit L2 becomes smaller beyond the lower limit in the inequality (6), a high magnification variation becomes difficult.

The inequality (7) defines a ratio of the overall lens length to the focal length of the zoom lens L0 at the telephoto end. If the overall lens length is longer beyond the upper limit in the inequality (7), the compact structure becomes difficult. If the overall lens length is shorter beyond the lower limit in the inequality (7), it becomes difficult to correct the aberrations, particularly the longitudinal chromatic aberration, the lateral chromatic aberration, and the curvature of field.

The inequality (8) defines a ratio of a sum of the distance between the first lens unit L1 and the second lens unit L2 at the telephoto end and the thickness of the first lens unit L1 to the focal length of the zoom lens L0 at the telephoto end. When the distance between the first and second lens units L1 and L2 becomes longer or the thickness of the first lens unit L1 increases beyond the upper limit in the inequality (8), the height of the off-axis light beam passing through the first lens unit L1 at the telephoto end becomes high. When the distance between the first and second lens units L1 and L2 becomes shorter or the thickness of the first lens unit L1 decreases beyond the lower limit in the inequality (8), the height of the on-axis light beam entering the second lens unit L2 becomes high and it becomes difficult to reduce the diameter of the second lens unit L2.

The inequality (9) defines a ratio of a sum of the distance between the first lens unit L1 and the second lens unit L2 at the wide-angle end and the thickness of the first lens unit L1 to the focal length of the zoom lens L0 at the wide-angle end. If the distance between the first and second lens units L1 and L2 becomes longer or the thickness of the first lens unit L1 increases beyond the upper limit in the inequality (9), the height of the off-axis light beam passing through the first lens unit L1 at the wide-angle end is high and the front lens diameter increases. If the distance between the first and second lens units L1 and L2 becomes shorter or the thickness of the first lens unit L1 decreases beyond the lower limit in the inequality (9), the height of the off-axis light beam passing through the second lens unit L2 at the wide-angle end is high and the diameter of the second lens unit L2 increases.

The inequality (10) defines a ratio of the focal length of the first lens unit L1 to the focal length of the zoom lens L0 at the telephoto end. If the focal length f1 of the first lens unit L1 becomes longer beyond the upper limit in the inequality (10), the overall lens length becomes long. If the focal length f1 of the first lens unit L1 becomes shorter beyond the lower limit in the inequality (10), it becomes difficult to correct the aberrations in the first lens unit L1, especially the spherical aberration, the longitudinal chromatic aberration, and the lateral chromatic aberration at the telephoto end.

The inequality (11) defines the imaging lateral magnification of the second lens unit L2 at the wide-angle end. If the absolute value of the imaging lateral magnification $\beta 2w$ of the second lens unit L2 at the wide-angle end becomes smaller beyond the upper limit in the inequality (11), the angle of the on-axis light beam incident on the rear unit LR at the wide-angle end becomes large and it is difficult to correct the spherical aberration at the wide-angle end. If the absolute value of the imaging lateral magnification $\beta 2w$ of the second lens unit L2 at the wide-angle end becomes larger beyond the lower limit in the inequality (11), the focal length of the zoom lens L0 at the wide-angle end becomes large and the high magnification variation becomes difficult.

The inequality (12) defines the Abbe number of the first positive lens L11P1 for the d-line. The aberration generated in the first lens unit L11 is magnified in the rear unit LR, and the magnifying power varies with the magnification variation. Therefore, in order to satisfactorily correct the chromatic aberration, it is important to set the Abbe number $\nu L11P1$ of the first positive lens L11P1 for the d-line to a proper value. If the Abbe number $\nu L11P1$ of the first positive lens L11P1 for the d-line is higher than the upper limit in the inequality (12), processing becomes difficult. If the Abbe number $\nu L11P1$ of the first positive lens L11P1 for the d-line is lower than the lower limit in the inequality (12), it is difficult to suppress fluctuations caused by the longitudinal and lateral chromatic aberrations along with the magnification variation.

The inequality (13) defines the Abbe number of the first negative lens L12N1 for the d-line. If the Abbe number $\nu L12N1$ of the first negative lens L12N1 for the d-line is higher than the upper limit in the inequality (13), the chromatic aberration correction is insufficient. If the Abbe number $\nu L12N1$ of the first negative lens L12N1 for the d-line becomes lower than the lower limit in the inequality (13), the chromatic aberration correction becomes excessive.

The inequality (14) defines a ratio of the distance between the first lens unit L11 and the second lens unit L12 to the thickness of the first lens unit L1. If the distance between the first and second lens units L11 and L12 becomes larger beyond the upper limit in the inequality (14), a difference in height of the off-axis light ray between the first and second lens units L11 and L12 at the wide-angle end becomes large and it becomes difficult to correct the aberrations, especially the distortion and the astigmatism at the wide-angle end. If the distance between the first and second lens units L11 and L12 becomes smaller beyond the lower limit in the inequality (14), a difference in height of the off-axis light ray between the first and second lens units L11 and L12 at the wide-angle end becomes small and the corrections of the aberrations, particularly the distortion and the astigmatism at the wide-angle end become excessive.

The numerical ranges of the inequalities (4) to (14) may be set to those of the following inequalities (4a) to (14a):

$$0.95<\Sigma f11/|f11i|<1.15 \tag{4a}$$

$$0.3<(r2+r1)/(r2-r1)<1.5 \tag{5a}$$

$$0.5<(D1t-D1w)/|f2|<1.8 \tag{6a}$$

$$0.49<Lt/ft<1.10 \tag{7a}$$

$$0.25<(T1+D1t)/ft<0.70 \tag{8a}$$

$$0.22<(T1+D1w)/fw<0.80 \tag{9a}$$

$$0.35<f1/ft<1.00 \tag{10a}$$

$$-3.5<\beta 2w<-0.3 \tag{11a}$$

$$64<\nu L11P1<97 \tag{12a}$$

$$35<\nu L12N1<50 \tag{13a}$$

$$0.40<d11/T1<0.95 \tag{14a}$$

The numerical ranges of the inequalities (4) to (14) may be set to those of the following inequalities (4b) to (14b):

$$0.99<\Sigma f11/|f11i|<1.10 \tag{4b}$$

$$0.4<(r2+r1)/(r2-r1)<1.0 \tag{5b}$$

$$0.63<(D1t-D1w)/|f2|<1.60 \tag{6b}$$

$$0.59<Lt/ft<1.05 \tag{7b}$$

$$0.26<(T1+D1t)/ft<0.50 \tag{8b}$$

$$0.25<(T1+D1w)/fw<0.68 \tag{9b}$$

$$0.41<f1/ft<0.89 \tag{10b}$$

$$-2.0<\beta 2w<-0.4 \tag{11b}$$

$$66<\nu L11P1<96 \tag{12b}$$

$$38<\nu L12N1<48 \tag{13b}$$

$$0.50<d11/T1<0.85 \tag{14b}$$

Next follows a detailed description of the zoom lens L0 according to each example.

The zoom lens L0 according to Example 1 includes, in order from the object side to the image side, a first lens unit L1 having a positive refractive power, a second lens unit L2 having a negative refractive power, an intermediate lens unit LM2 having a positive refractive power, and a rear lens unit LR having a positive refractive power. The first lens unit L1 includes, in order from the object side to the image side, a first subunit L11 having a positive refractive power and a second subunit L12. The rear unit LR includes, in order from the object side to the image side, lens units LR1, LR2, and LR3. During zooming, the first lens unit L1 and the lens units LR1 and LR3 are immovable relative to the image plane. During focusing, the lens unit LR2 moves. The lens unit LR1 includes a diaphragm (aperture stop) SP. During zooming, the intermediate lens unit LM2 moves on a trajectory different from that of the second lens unit L2.

The zoom lens L0 according to Example 2 includes, in order from the object side to the image side, a first lens unit L1 having a positive refractive power, a second lens unit L2 having a negative refractive power, an intermediate lens unit LM2 having a negative refractive power, and a rear lens unit LR having a positive refractive power. The first lens unit L1 includes, in order from the object side to the image side, a first subunit L11 having a positive refractive power and a second subunit L12. The rear unit LR includes lens units LR1, LR2, and LR3 arranged in this order from the object side to the image side. During zooming, the first lens unit L1 and the lens units LR1 and LR3 are immovable relative to the image plane. During focusing, the lens unit LR2 moves. The lens unit LR1 includes a diaphragm SP. During zooming, the intermediate lens unit LM2 moves on a trajectory different from that of the second lens unit L2.

The zoom lens L0 according to Example 3 includes, in order from the object side to the image side, a first lens unit L1 having a positive refractive power, an intermediate lens unit LM1 having a positive refractive power, a second lens unit L2 having a negative refractive power, and a rear unit LR having a positive refractive power. The first lens unit L1 includes a first subunit L11 having a positive refractive power and a second subunit L12 arranged in this order from the object side to the image side. The rear unit LR includes lens units LR1, LR2, LR3, and LR4 arranged in this order from the object side to the image side. During zooming, the second lens unit L2 is immovable relative to the image plane. During focusing, the lens unit LR2 moves. The lens unit LR1 includes a diaphragm SP. During zooming, the first lens unit L1, the intermediate lens unit LM2, and the lens units LR1, LR2, LR3, and LR4 move on different trajectories.

The zoom lens L0 according to Example 4 includes, in order from the object side to the image side, a first lens unit L1 having a positive refractive power, a second lens unit L2 having a negative refractive power, an intermediate lens unit LM2 having a positive refractive power, and a rear lens unit LR having a positive refractive power. The first lens unit L1 includes a first subunit L11 having a positive refractive power and a second subunit L12 arranged in this order from the object side to the image side. The rear unit LR includes lens units LR1, LR2, and LR3 arranged in this order from the object side to the image side. During zooming, the first lens unit L1 and the lens units LR1 and LR3 are immovable relative to the image plane. During focusing, the lens unit LR2 moves. The lens unit LR1 includes a diaphragm SP. During zooming, the intermediate lens unit LM2 moves on a trajectory different from that of the second lens unit L2.

The zoom lens L0 according to Example 5 includes, in order from the object side to the image side, a first lens unit L1 having a positive refractive power, a second lens unit L2 having a negative refractive power, an intermediate lens unit LM2 having a positive refractive power, and a rear lens unit LR having a positive refractive power. The first lens unit L1 includes a first subunit L11 having a positive refractive power and a second subunit L12 arranged in this order from the object side to the image side. During zooming, the first lens unit L1 and the rear unit LR are immovable relative to the image plane. During focusing, the intermediate lens unit LM2 moves. The rear unit LR1 includes a diaphragm SP. During zooming, the intermediate lens unit LM2 moves on a trajectory different from that of the second lens unit L2.

The zoom lens L0 according to Example 6 includes, in order from the object side to the image side, a first lens unit L1 having a positive refractive power, a second lens unit L2 having a negative refractive power, an intermediate lens unit LM2 having a positive refractive power, and a rear unit LR having a positive refractive power. The first lens unit L1 includes a first subunit L11 having a positive refractive power and a second subunit L12 arranged in this order from the object side to the image side. The rear unit LR includes lens units LR1, LR2, and LR3 arranged in this order from the object side to the image side. During zooming, the first lens unit L1 and the lens units LR1 and LR3 are immovable relative to the image plane. During focusing, the lens unit LR2 moves. The lens unit LR1 includes a diaphragm SP. During zooming, the intermediate lens unit LM2 moves on a trajectory different from that of the second lens unit L2.

The zoom lens L0 according to Example 7 includes, in order from the object side to the image side, a first lens unit L1 having a positive refractive power, a second lens unit L2 having a negative refractive power, an intermediate lens unit LM2 having a positive refractive power, and a rear unit LR having a positive refractive power. The first lens unit L1 includes a first subunit L11 having a positive refractive power and a second subunit L12 arranged in this order from the object side to the image side. The rear unit LR includes lens units LR1, LR2, and LR3 arranged in this order from the object side to the image side. During zooming, the first lens unit L1 and the lens units LR1 and LR3 are immovable relative to the image plane. During focusing, the lens unit LR2 moves. The lens unit LR1 includes a diaphragm SP. During zooming, the intermediate lens unit LM2 moves on a trajectory different from that of the lens unit L2.

In the zoom lens L0 according to each example, all surfaces having refractive powers are made of refractive surfaces. The zoom lens L0 according to each example can acquire an optical performance equivalent with or higher than that of a diffractive optical element or a reflective surface with a manufacturing difficulty lower than that of the diffractive optical element or the reflective surface.

In the zoom lens L0 according to each example, the image stabilization may be made by moving part of the zoom lens L0 in a direction having a component of a direction orthogonal to the optical axis. In particular, when the part to be moved during the image stabilization is set to a lens unit disposed on the image side of the first lens unit L1 having a relatively small diameter, a driving actuator and consequently the lens apparatus including the zoom lens L0 can be made compact.

Numerical examples 1 to 7 corresponding to Examples 1 to 7 will be shown below.

In surface data according to each numerical example, r represents a radius of curvature of each optical surface, and d (mm) represents an on-axis distance (distance on the optical axis) between an m-th plane and an (m+1)-th plane, where m is a surface number counted from the light incident side. nd represents a refractive index of each optical element for the d-line, and νd represents an Abbe number of the optical element for the d-line. The Abbe number νd for the d-line of a certain material is expressed as follows:

$$\nu d=(Nd-1)/(NF-NC)$$

where Nd, NF, and NC are refractive indexes for the d-line (587.6 nm), F-line (486.1 nm), and C-line (656.3 nm) in the Fraunhofer line.

In each numerical example, d, focal length (mm), F number, and half angle of view (°) all have values when the zoom lens L0 according to each example focuses on an infinity object. A "backfocus" is a distance on the optical axis from the final lens surface (lens surface closest to the image plane) to the paraxial image plane in terms of air equivalent length. An "overall lens length" is a length obtained by adding the backfocus to a distance on the optical axis from the frontmost surface (lens surface closest to the object) to the final surface of the zoom lens L0. A "lens unit" may include a single lens or a plurality of lenses.

Numerical Example 1

UNIT: mm

Surface Data

| Surface No. | r | d | nd | vd |
|---|---|---|---|---|
| 1 | 248.192 | 10.81 | 1.49700 | 81.5 |
| 2 | −1007.866 | 93.92 | | |
| 3 | 222.406 | 10.34 | 1.43387 | 95.1 |
| 4 | −252.824 | 0.20 | | |
| 5 | −251.973 | 2.40 | 1.61340 | 44.3 |
| 6 | 420.422 | (Variable) | | |
| 7 | 321.884 | 2.40 | 1.59175 | 43.6 |
| 8 | 82.316 | 7.02 | | |
| 9 | −135.931 | 2.00 | 1.49700 | 81.5 |
| 10 | 529.745 | (Variable) | | |
| 11 | 126.315 | 4.22 | 1.80518 | 25.4 |
| 12 | 3742.503 | 1.97 | | |
| 13 | −203.607 | 2.00 | 1.49700 | 81.5 |
| 14 | 221.186 | (Variable) | | |
| 15 | 80.565 | 7.57 | 1.43875 | 94.7 |
| 16 | −400.051 | 0.20 | | |
| 17 | 81.828 | 4.73 | 1.43875 | 94.7 |
| 18 | 287.027 | 25.54 | | |
| 19(Diaphragm) | ∞ | 5.18 | | |
| 20 | 64.019 | 3.48 | 1.49700 | 81.5 |
| 21 | 134.232 | 3.04 | | |
| 22 | −119.502 | 2.00 | 1.72916 | 54.7 |
| 23 | 47.661 | 3.68 | | |
| 24 | 116.667 | 1.80 | 1.72047 | 34.7 |
| 25 | 60.414 | 6.63 | 1.49700 | 81.5 |
| 26 | −95.360 | 0.15 | | |
| 27 | 87.909 | 3.18 | 1.91082 | 35.3 |
| 28 | 775.767 | 3.27 | | |
| 29 | −108.619 | 1.80 | 1.91082 | 35.3 |
| 30 | 5245.315 | 0.93 | | |
| 31 | 69.836 | 7.58 | 1.48749 | 70.2 |
| 32 | −64.861 | (Variable) | | |
| 33 | 66.524 | 1.80 | 1.92286 | 20.9 |
| 34 | 44.442 | 11.14 | | |
| 35 | −125.659 | 1.30 | 1.59282 | 68.6 |
| 36 | 89.736 | (Variable) | | |
| 37 | 121.240 | 6.76 | 1.61340 | 44.3 |
| 38 | −97.863 | 0.15 | | |
| 39 | 82.871 | 5.36 | 1.69925 | 30.3 |
| 40 | −360.199 | 2.06 | | |
| 41 | 28868.349 | 2.00 | 1.53775 | 74.7 |
| 42 | 84.290 | 4.87 | | |
| 43 | −89.575 | 2.00 | 1.76385 | 48.5 |
| 44 | 180.746 | (Variable) | | |
| Image Plane | ∞ | | | |

VARIOUS DATA
ZOOM RATIO 2.35

| | WIDE-ANGLE | MIDDLE | TELEPHOTO |
|---|---|---|---|
| Focal Length: | 206.00 | 316.02 | 485.01 |
| FNO | 4.09 | 4.10 | 4.10 |
| Half Angle of View: (°) | 6.00 | 3.92 | 2.55 |
| Image Height | 21.64 | 21.64 | 21.64 |
| Overall lens length | 486.99 | 486.99 | 486.99 |
| BF | 53.96 | 53.96 | 53.96 |
| d 6 | 10.70 | 62.95 | 110.60 |
| d10 | 24.66 | 11.58 | 1.71 |
| d14 | 77.95 | 38.78 | 1.00 |
| d32 | 1.27 | 3.30 | 1.00 |
| d36 | 62.96 | 60.94 | 63.24 |
| d44 | 53.96 | 53.96 | 53.96 |

-continued

UNIT: mm

Zoom Lens Unit Data

| Lens Unit | Starting Surface | Focal Length: |
|---|---|---|
| 1 | 1 | 418.09 |
| 2 | 7 | −99.05 |
| 3 | 11 | 620.05 |
| 4 | 15 | 81.22 |
| 5 | 33 | −53.48 |
| 6 | 37 | 163.86 |

Numerical Example 2

UNIT: mm

Surface Data

| Surface No. | r | d | nd | vd |
|---|---|---|---|---|
| 1 | 1600.000 | 3.00 | 1.51742 | 52.4 |
| 2 | 1200.000 | 0.30 | | |
| 3 | 210.695 | 12.26 | 1.43387 | 95.1 |
| 4 | −1018.987 | 100.00 | | |
| 5 | −244.133 | 2.40 | 1.65412 | 39.7 |
| 6 | −1066.668 | 0.30 | | |
| 7 | 154.528 | 9.69 | 1.43387 | 95.1 |
| 8 | −873.781 | 1.00 | | |
| 9 | 96.903 | 3.60 | 1.61340 | 44.3 |
| 10 | 80.471 | (Variable) | | |
| 11 | 230.656 | 2.40 | 1.49700 | 81.5 |
| 12 | 83.484 | 5.89 | | |
| 13 | −245.992 | 2.00 | 1.49700 | 81.5 |
| 14 | 163.836 | (Variable) | | |
| 15 | 100.550 | 3.76 | 1.80518 | 25.4 |
| 16 | 291.045 | 3.44 | | |
| 17 | −172.487 | 2.00 | 1.59282 | 68.6 |
| 18 | 257.501 | (Variable) | | |
| 19 | 86.441 | 8.52 | 1.43875 | 94.7 |
| 20 | −171.141 | 0.20 | | |
| 21 | 73.650 | 4.27 | 1.43875 | 94.7 |
| 22 | 171.134 | 26.19 | | |
| 23(Diaphragm) | ∞ | 5.65 | | |
| 24 | 65.272 | 4.03 | 1.49700 | 81.5 |
| 25 | 231.958 | 2.67 | | |
| 26 | −98.100 | 2.00 | 1.80400 | 46.5 |
| 27 | 51.202 | 3.37 | | |
| 28 | 121.168 | 1.80 | 1.71617 | 45.5 |
| 29 | 59.531 | 6.63 | 1.49700 | 81.5 |
| 30 | −90.820 | 0.15 | | |
| 31 | 93.749 | 3.41 | 1.80400 | 46.5 |
| 32 | −969.687 | 3.04 | | |
| 33 | −96.382 | 1.80 | 1.83481 | 42.7 |
| 34 | −3738.973 | 1.89 | | |
| 35 | 85.232 | 9.32 | 1.51633 | 64.1 |
| 36 | −60.343 | (Variable) | | |
| 37 | 83.224 | 1.80 | 1.92286 | 20.9 |
| 38 | 57.953 | 4.95 | | |
| 39 | −266.633 | 1.30 | 1.48749 | 70.2 |
| 40 | 55.760 | (Variable) | | |
| 41 | −903.238 | 2.00 | 1.49700 | 81.5 |
| 42 | 289.600 | 10.33 | | |
| 43 | 133.666 | 6.41 | 1.56732 | 42.8 |
| 44 | −74.873 | 0.15 | | |
| 45 | 127.191 | 3.91 | 1.62004 | 36.3 |
| 46 | −252.092 | 5.19 | | |
| 47 | −140.515 | 2.00 | 1.49700 | 81.5 |
| 48 | 110.305 | 4.40 | | |
| 49 | −66.763 | 2.00 | 1.49700 | 81.5 |
| 50 | −2087.402 | (Variable) | | |
| Image Plane | ∞ | | | |

| UNIT: mm | | |
|---|---|---|
| VARIOUS DATA ZOOM RATIO 2.35 | | |

| | WIDE-ANGLE | MIDDLE | TELEPHOTO |
|---|---|---|---|
| Focal Length: | 206.00 | 316.09 | 485.00 |
| FNO | 4.10 | 4.10 | 4.10 |
| Half Angle of View: (°) | 6.00 | 3.92 | 2.55 |
| Image Height | 21.64 | 21.64 | 21.64 |
| Overall lens length | 487.46 | 487.46 | 487.46 |
| BF | 57.50 | 57.50 | 57.50 |
| d10 | 5.04 | 54.32 | 99.04 |
| d14 | 34.12 | 15.61 | 3.02 |
| d18 | 63.89 | 33.13 | 1.00 |
| d36 | 1.21 | 3.60 | 1.25 |
| d40 | 44.26 | 41.87 | 44.22 |
| d50 | 57.50 | 57.50 | 57.50 |

| Zoom Lens Unit Data | | |
|---|---|---|
| Lens Unit | Starting Surface | Focal Length: |
| 1 | 1 | 403.25 |
| 2 | 11 | −111.72 |
| 3 | 15 | −4063.64 |
| 4 | 19 | 82.71 |
| 5 | 37 | −64.83 |
| 6 | 41 | 244.21 |

Numerical Example 3

| UNIT: mm | | | |
|---|---|---|---|
| Surface Data | | | |
| Surface No. | r | d | nd | vd |
|---|---|---|---|---|
| 1 | 137.343 | 10.40 | 1.49700 | 81.5 |
| 2 | −1178.632 | 60.88 | | |
| 3 | 134.515 | 8.51 | 1.49700 | 81.5 |
| 4 | −193.641 | 2.00 | 1.80400 | 46.5 |
| 5 | 211.141 | (Variable) | | |
| 6 | 133.079 | 2.94 | 1.68893 | 31.1 |
| 7 | 497.101 | (Variable) | | |
| 8 | 184.983 | 1.00 | 1.90043 | 37.4 |
| 9 | 72.740 | 2.80 | | |
| 10 | −99.328 | 1.00 | 1.78590 | 44.2 |
| 11 | 74.759 | 3.23 | 1.85478 | 24.8 |
| 12 | −703.689 | (Variable) | | |
| 13 | 886.009 | 4.10 | 1.51742 | 52.4 |
| 14 | −45.297 | 0.15 | | |
| 15 | 112.007 | 5.59 | 1.48749 | 70.2 |
| 16 | −31.443 | 1.60 | 1.90043 | 37.4 |
| 17 | −166.051 | 2.00 | | |
| 18 | −41.628 | 1.80 | 1.90043 | 37.4 |
| 19 | −153.362 | 2.05 | | |
| 20(Diaphragm) | ∞ | 5.08 | | |
| 21 | −1339.263 | 4.46 | 1.51742 | 52.4 |
| 22 | −38.669 | 7.86 | | |
| 23 | −617.496 | 2.79 | 1.51742 | 52.4 |
| 24 | −75.090 | (Variable) | | |
| 25 | 110.379 | 1.40 | 1.59282 | 68.6 |
| 26 | 44.592 | (Variable) | | |
| 27 | 81.873 | 4.83 | 1.51742 | 52.4 |
| 28 | −93.550 | (Variable) | | |
| 29 | 179.629 | 1.60 | 1.49700 | 81.5 |
| 30 | 48.683 | 5.64 | | |
| 31 | −49.626 | 1.80 | 1.49700 | 81.5 |
| 32 | 79.591 | 2.79 | 1.85478 | 24.8 |
| 33 | 167.470 | (Variable) | | |
| Image Plane | ∞ | | | |

| UNIT: mm | | |
|---|---|---|
| VARIOUS DATA ZOOM RATIO 3.79 | | |

| | WIDE-ANGLE | MIDDLE | TELEPHOTO |
|---|---|---|---|
| Focal Length: | 154.50 | 312.26 | 585.00 |
| FNO | 5.10 | 5.81 | 6.51 |
| Half Angle of View: (°) | 7.97 | 3.96 | 2.12 |
| Image Height | 21.64 | 21.64 | 21.64 |
| Overall lens length | 288.00 | 338.00 | 388.00 |
| BF | 15.00 | 57.16 | 95.75 |
| d 5 | 3.19 | 59.57 | 109.32 |
| d 7 | 8.68 | 2.30 | 2.56 |
| d12 | 38.93 | 23.60 | 3.38 |
| d24 | 25.30 | 19.17 | 1.46 |
| d26 | 18.09 | 11.14 | 18.91 |
| d28 | 30.52 | 16.75 | 8.33 |
| d33 | 15.00 | 57.16 | 95.75 |

| Zoom Lens Unit Data | | |
|---|---|---|
| Lens Unit | Starting Surface | Focal Length: |
| 1 | 1 | 331.05 |
| 2 | 6 | 262.92 |
| 3 | 8 | −75.12 |
| 4 | 13 | 77.25 |
| 5 | 25 | −127.22 |
| 6 | 27 | 85.18 |
| 7 | 29 | −53.88 |

Numerical Example 4

| UNIT: mm | | | |
|---|---|---|---|
| Surface Data | | | |
| Surface No. | r | d | nd | vd |
|---|---|---|---|---|
| 1 | 192.768 | 10.01 | 1.59349 | 67.0 |
| 2 | −565.950 | 29.08 | | |
| 3 | 130.790 | 11.87 | 1.43387 | 95.1 |
| 4 | −249.363 | 0.61 | | |
| 5 | −240.070 | 2.40 | 1.61340 | 44.3 |
| 6 | 161.424 | (Variable) | | |
| 7 | 102.744 | 2.40 | 1.75500 | 52.3 |
| 8 | 62.690 | 8.30 | | |
| 9 | −137.352 | 2.00 | 1.59282 | 68.6 |
| 10 | 356.484 | (Variable) | | |
| 11 | 103.405 | 3.92 | 1.85478 | 24.8 |
| 12 | 374.851 | 2.78 | | |
| 13 | −205.180 | 2.00 | 1.59282 | 68.6 |
| 14 | 289.058 | (Variable) | | |
| 15 | 134.709 | 5.51 | 1.43875 | 94.7 |
| 16 | −294.584 | 0.20 | | |
| 17 | 65.635 | 6.62 | 1.49700 | 81.5 |
| 18 | 444.827 | 29.83 | | |
| 19(Diaphragm) | ∞ | 0.01 | | |
| 20 | 68.881 | 3.53 | 1.49700 | 81.5 |
| 21 | 167.836 | 2.46 | | |
| 22 | −145.136 | 2.00 | 1.72916 | 54.1 |
| 23 | 44.979 | 3.63 | | |
| 24 | 101.451 | 1.80 | 1.83481 | 42.7 |
| 25 | 62.708 | 5.73 | 1.49700 | 81.5 |
| 26 | −124.805 | 0.15 | | |
| 27 | 99.323 | 2.91 | 1.80400 | 46.5 |
| 28 | 920.217 | 3.78 | | |
| 29 | −77.925 | 1.80 | 1.72047 | 34.7 |
| 30 | −291.757 | 0.14 | | |
| 31 | 72.543 | 7.03 | 1.49700 | 81.5 |
| 32 | −63.811 | (Variable) | | |
| 33 | 67.818 | 1.80 | 1.92286 | 20.9 |
| 34 | 49.926 | 2.84 | | |

-continued

UNIT: mm

| | | | | |
|---|---|---|---|---|
| 35 | −418.819 | 1.30 | 1.49700 | 81.5 |
| 36 | 60.744 | (Variable) | | |
| 37 | 169.755 | 2.00 | 1.49700 | 81.5 |
| 38 | 54.274 | 1.79 | | |
| 39 | 87.282 | 3.82 | 1.73800 | 32.3 |
| 40 | −2061.573 | 0.15 | | |
| 41 | 70.343 | 7.19 | 1.61340 | 44.3 |
| 42 | −88.421 | 0.20 | | |
| 43 | −172.560 | 2.00 | 1.49700 | 81.5 |
| 44 | 84.236 | 4.18 | | |
| 45 | −98.387 | 2.00 | 1.59282 | 68.6 |
| 46 | 311.306 | (Variable) | | |
| Image Plane | ∞ | | | |

VARIOUS DATA
ZOOM RATIO 1.90

| | WIDE-ANGLE | MIDDLE | TELEPHOTO |
|---|---|---|---|
| Focal Length: | 205.00 | 282.75 | 390.00 |
| FNO | 4.10 | 4.10 | 4.10 |
| Half Angle of View: (°) | 6.02 | 4.38 | 3.18 |
| Image Height | 21.64 | 21.64 | 21.64 |
| Overall lens length | 367.09 | 367.09 | 367.09 |
| BF | 46.68 | 46.68 | 46.68 |
| d 6 | 1.00 | 34.37 | 66.02 |
| d10 | 11.89 | 6.28 | 1.67 |
| d14 | 55.80 | 28.04 | 1.00 |
| d32 | 3.72 | 4.30 | 1.00 |
| d36 | 66.27 | 65.69 | 68.99 |
| d46 | 46.68 | 46.68 | 46.68 |

Zoom Lens Unit Data

| Lens Unit | Starting Surface | Focal Length: |
|---|---|---|
| 1 | 1 | 300.89 |
| 2 | 7 | −93.12 |
| 3 | 11 | 791.74 |
| 4 | 15 | 79.43 |
| 5 | 33 | −71.15 |
| 6 | 37 | 356.92 |

Numerical Example 5

UNIT: mm

Surface Data

| Surface No. | r | d | nd | vd |
|---|---|---|---|---|
| 1 | 181.344 | 10.48 | 1.49700 | 81.5 |
| 2 | −496.472 | 33.41 | | |
| 3 | 181.330 | 9.62 | 1.43875 | 94.7 |
| 4 | −240.523 | 1.50 | 1.83481 | 42.7 |
| 5 | 298.470 | 0.20 | | |
| 6 | 158.254 | 7.26 | 1.43387 | 95.1 |
| 7 | −1257.157 | (Variable) | | |
| 8 | 455.708 | 5.46 | 1.90366 | 31.3 |
| 9 | −81.648 | 1.50 | 1.59282 | 68.6 |
| 10 | 70.480 | 2.87 | | |
| 11 | 1543.213 | 1.50 | 1.59282 | 68.6 |
| 12 | 102.636 | 3.67 | 1.90366 | 31.3 |
| 13 | 860.825 | 1.08 | | |
| 14 | −244.951 | 1.50 | 1.59282 | 68.6 |
| 15 | 262.498 | 3.66 | | |
| 16 | −63.775 | 1.50 | 1.83481 | 42.7 |
| 17 | 258.606 | (Variable) | | |
| 18 | 107.388 | 4.93 | 1.49700 | 81.5 |
| 19 | −184.438 | 0.20 | | |
| 20 | 95.447 | 1.50 | 1.83400 | 37.2 |
| 21 | 45.866 | 6.76 | 1.49700 | 81.5 |
| 22 | −681.970 | (Variable) | | |
| 23 | −63.568 | 1.50 | 1.76182 | 26.5 |
| 24 | −94.759 | 0.20 | | |
| 25 | 56.749 | 6.84 | 1.53775 | 74.7 |
| 26 | −208.996 | 2.00 | | |
| 27(Diaphragm) | ∞ | (Variable) | | |
| 28 | 123.622 | 3.99 | 1.80610 | 33.3 |
| 29 | −113.323 | 1.50 | 1.51633 | 64.1 |
| 30 | 58.693 | 2.90 | | |
| 31 | −120.944 | 1.50 | 1.65160 | 58.5 |
| 32 | 56.031 | (Variable) | | |
| 33 | 78.530 | 3.67 | 1.62299 | 58.2 |
| 34 | −875.305 | 0.20 | | |
| 35 | 89.890 | 3.99 | 1.62299 | 58.2 |
| 36 | −206.504 | 3.05 | | |
| 37 | −36.547 | 1.50 | 1.80610 | 33.3 |
| 38 | −58.039 | 40.00 | | |
| 39 | 140.268 | 3.13 | 1.51742 | 52.4 |
| 40 | 672.633 | (Variable) | | |
| Image Plane | ∞ | | | |

VARIOUS DATA
ZOOM RATIO 1.90

| | WIDE-ANGLE | MIDDLE | TELEPHOTO |
|---|---|---|---|
| Focal Length: | 205.00 | 301.98 | 389.00 |
| FNO | 4.12 | 4.12 | 4.12 |
| Half Angle of View: (°) | 6.02 | 4.10 | 3.18 |
| Image Height | 21.64 | 21.64 | 21.64 |
| Overall lens length | 370.15 | 370.15 | 370.15 |
| BF | 61.37 | 61.37 | 61.37 |
| d 7 | 35.10 | 58.63 | 69.70 |
| d17 | 28.64 | 14.57 | 2.00 |
| d22 | 38.40 | 28.94 | 30.44 |
| d27 | 29.61 | 29.61 | 29.61 |
| d32 | 2.49 | 2.49 | 2.49 |
| d40 | 61.37 | 61.37 | 61.37 |

Zoom Lens Unit Data

| Lens Unit | Starting Surface | Focal Length: |
|---|---|---|
| 1 | 1 | 213.90 |
| 2 | 8 | −46.51 |
| 3 | 18 | 106.13 |
| 4 | 23 | 121.17 |
| 5 | 28 | −61.73 |
| 6 | 33 | 80.87 |

Numerical Example 6

UNIT: mm

Surface Data

| Surface No. | r | d | nd | vd |
|---|---|---|---|---|
| 1 | 600.000 | 3.20 | 1.48749 | 70.2 |
| 2 | 800.000 | 0.30 | | |
| 3 | 179.672 | 10.90 | 1.43387 | 95.1 |
| 4 | −495.656 | 53.46 | | |
| 5 | 182.557 | 6.46 | 1.43387 | 95.1 |
| 6 | −829.929 | 1.62 | | |
| 7 | −348.214 | 2.00 | 1.61340 | 44.3 |
| 8 | 297.573 | (Variable) | | |
| 9 | 763.380 | 2.00 | 1.49700 | 81.5 |
| 10 | 68.234 | 4.36 | | |
| 11 | −103.778 | 2.00 | 1.59282 | 68.6 |
| 12 | 401.764 | (Variable) | | |
| 13 | 120.486 | 2.90 | 1.80518 | 25.4 |
| 14 | −2121.523 | 0.48 | | |
| 15 | −351.633 | 2.00 | 1.59282 | 68.6 |
| 16 | 218.545 | (Variable) | | |

-continued

UNIT: mm

| | | | | |
|---|---|---|---|---|
| 17 | 100.125 | 3.78 | 1.43875 | 94.7 |
| 18 | −414.245 | 0.33 | | |
| 19 | 67.984 | 3.87 | 1.43875 | 94.7 |
| 20 | 498.481 | 21.57 | | |
| 21(Diaphragm) | ∞ | 0.22 | | |
| 22 | 68.761 | 3.34 | 1.49700 | 81.5 |
| 23 | 352.445 | 1.06 | | |
| 24 | −199.283 | 2.00 | 1.80400 | 46.5 |
| 25 | 49.295 | 5.69 | | |
| 26 | 93.500 | 2.00 | 1.72916 | 54.7 |
| 27 | 53.934 | 4.71 | 1.49700 | 81.5 |
| 28 | −119.758 | 0.25 | | |
| 29 | 118.985 | 2.11 | 1.80400 | 46.5 |
| 30 | 461.369 | 3.04 | | |
| 31 | −84.524 | 2.00 | 1.96300 | 24.1 |
| 32 | −584.778 | 0.15 | | |
| 33 | 100.248 | 4.51 | 1.59551 | 39.2 |
| 34 | −70.014 | (Variable) | | |
| 35 | 250.325 | 2.00 | 1.83481 | 42.7 |
| 36 | 98.568 | 1.17 | | |
| 37 | 1834.762 | 2.00 | 1.76385 | 48.5 |
| 38 | 213.695 | (Variable) | | |
| 39 | −94.335 | 1.40 | 1.80400 | 46.5 |
| 40 | 79.557 | 0.99 | | |
| 41 | 67.956 | 3.69 | 1.61340 | 44.3 |
| 42 | −67.668 | 55.54 | | |
| 43 | 767.812 | 1.80 | 1.43875 | 94.7 |
| 44 | 43.459 | 5.35 | 1.61340 | 44.3 |
| 45 | −83.139 | 0.56 | | |
| 46 | −62.127 | 2.00 | 1.43875 | 94.7 |
| 47 | 456.486 | 2.01 | | |
| 48 | −59.541 | 2.00 | 1.49700 | 81.5 |
| 49 | −307.180 | (Variable) | | |
| Image Plane | ∞ | | | |

VARIOUS DATA
ZOOM RATIO 2.54

| | WIDE-ANGLE | MIDDLE | TELEPHOTO |
|---|---|---|---|
| Focal Length: | 305.00 | 485.95 | 774.99 |
| FNO | 8.09 | 8.10 | 8.10 |
| Half Angle of View: (°) | 4.06 | 2.55 | 1.60 |
| Image Height | 21.64 | 21.64 | 21.64 |
| Overall lens length | 489.78 | 489.78 | 489.78 |
| BF | 100.04 | 100.04 | 100.04 |
| d 8 | 45.70 | 88.03 | 126.95 |
| d12 | 28.93 | 13.60 | 1.45 |
| d16 | 54.77 | 27.77 | 1.00 |
| d34 | 1.14 | 6.17 | 1.00 |
| d38 | 26.39 | 21.36 | 26.53 |
| d49 | 100.04 | 100.04 | 100.04 |

Zoom Lens Unit Data

| Lens Unit | Starting Surface | Focal Length: |
|---|---|---|
| 1 | 1 | 348.98 |
| 2 | 9 | −71.23 |
| 3 | 13 | 364.94 |
| 4 | 17 | 81.36 |
| 5 | 35 | −120.65 |
| 6 | 39 | −397.62 |

Numerical Example 7

UNIT: mm

Surface Data

| Surface No. | r | d | nd | vd |
|---|---|---|---|---|
| 1 | 400.000 | 5.60 | 1.59349 | 67.0 |
| 2 | ∞ | 0.30 | | |
| 3 | 154.576 | 9.97 | 1.43387 | 95.1 |
| 4 | −1622.495 | 43.14 | | |
| 5 | 122.825 | 9.47 | 1.43875 | 94.7 |
| 6 | −328.709 | 2.40 | 1.61340 | 44.3 |
| 7 | 126.402 | (Variable) | | |
| 8 | 129.510 | 3.49 | 1.48749 | 70.2 |
| 9 | 209.619 | 6.88 | | |
| 10 | 147.953 | 1.80 | 1.54072 | 47.2 |
| 11 | 48.454 | 7.56 | | |
| 12 | −127.286 | 1.70 | 1.53775 | 74.7 |
| 13 | 218.082 | (Variable) | | |
| 14 | 70.892 | 3.96 | 1.85478 | 24.8 |
| 15 | 213.260 | 3.27 | | |
| 16 | −134.064 | 1.80 | 1.59282 | 68.6 |
| 17 | 155.534 | (Variable) | | |
| 18 | 115.739 | 4.42 | 1.49700 | 81.5 |
| 19 | −428.709 | 0.14 | | |
| 20 | 58.479 | 5.23 | 1.49700 | 81.5 |
| 21 | 233.567 | 19.97 | | |
| 22(Diaphragm) | ∞ | 0.01 | | |
| 23 | 90.337 | 2.91 | 1.49700 | 81.5 |
| 24 | 205.595 | 1.25 | | |
| 25 | −978.689 | 2.00 | 1.87070 | 40.7 |
| 26 | 56.242 | 2.53 | | |
| 27 | 92.105 | 1.80 | 1.92286 | 20.9 |
| 28 | 64.222 | 5.60 | 1.49700 | 81.5 |
| 29 | −136.344 | 0.15 | | |
| 30 | 96.638 | 2.69 | 1.90366 | 31.3 |
| 31 | 330.341 | 0.96 | | |
| 32 | 53.900 | 3.96 | 1.48749 | 70.2 |
| 33 | 162.524 | (Variable) | | |
| 34 | −674.987 | 3.17 | 1.85478 | 24.8 |
| 35 | −68.844 | 1.30 | 1.74950 | 35.3 |
| 36 | 60.778 | (Variable) | | |
| 37 | 123.600 | 1.98 | 1.49700 | 81.5 |
| 38 | 66.985 | 9.94 | | |
| 39 | 77.720 | 7.14 | 1.61340 | 44.3 |
| 40 | −111.444 | 15.91 | | |
| 41 | −89.491 | 1.98 | 1.49700 | 81.5 |
| 42 | 156.732 | (Variable) | | |
| Image Plane | ∞ | | | |

VARIOUS DATA
ZOOM RATIO 1.90

| | WIDE-ANGLE | MIDDLE | TELEPHOTO |
|---|---|---|---|
| Focal Length: | 205.01 | 281.28 | 389.96 |
| FNO | 4.10 | 4.10 | 4.10 |
| Half Angle of View: (°) | 6.02 | 4.40 | 3.18 |
| Image Height | 21.64 | 21.64 | 21.64 |
| Overall lens length | 367.02 | 367.02 | 367.02 |
| BF | 39.99 | 39.99 | 39.99 |
| d 7 | 2.25 | 27.33 | 52.64 |
| d13 | 7.20 | 3.69 | 1.00 |
| d17 | 45.56 | 23.99 | 1.37 |
| d33 | 3.09 | 4.83 | 3.08 |
| d36 | 72.56 | 70.82 | 72.57 |
| d42 | 39.99 | 39.99 | 39.99 |

Zoom Lens Unit Data

| Lens Unit | Starting Surface | Focal Length: |
|---|---|---|
| 1 | 1 | 290.10 |
| 2 | 8 | −78.83 |
| 3 | 14 | 2720.21 |
| 4 | 18 | 64.32 |
| 5 | 34 | −82.71 |
| 6 | 37 | 337.28 |

Table 1 shows the values corresponding to the inequalities (1) to (14) in each numerical example.

TABLE 1

| Condi. Exp. | | Numerical Example | | | | | | |
|---|---|---|---|---|---|---|---|---|
| | | 1 | 2 | 3 | 4 | 5 | 6 | 7 |
| (1) | d11/f11 | 0.234 | 0.248 | 0.245 | 0.119 | 0.124 | 0.175 | 0.196 |
| (2) | f11/f1 | 0.961 | 1.047 | 0.750 | 0.809 | 1.256 | 0.826 | 0.760 |
| (3) | f1/f2 | −4.221 | −3.609 | −4.407 | −3.231 | −4.599 | −4.899 | −3.680 |
| (4) | Σ (f11/|f1i|) | 1.000 | 1.091 | 1.000 | 1.000 | 1.000 | 1.002 | 1.004 |
| (5) | (r2 + r1)/(r2 − r1) | 0.605 | 0.657 | 0.791 | 0.492 | 0.465 | 0.468 | 0.826 |
| (6) | (D1t − D1w)/|f2| | 1.009 | 0.841 | 1.494 | 0.698 | 0.744 | 1.141 | 0.639 |
| (7) | Lt/ft | 1.004 | 1.005 | 0.663 | 0.941 | 0.952 | 0.632 | 0.941 |
| (8) | (T1 + D1t)/ft | 0.471 | 0.478 | 0.336 | 0.308 | 0.340 | 0.264 | 0.317 |
| (9) | (T1 + D1w)/fw | 0.623 | 0.668 | 0.625 | 0.268 | 0.476 | 0.405 | 0.357 |
| (10) | f1/ft | 0.862 | 0.831 | 0.566 | 0.772 | 0.550 | 0.450 | 0.744 |
| (11) | β2w | −0.536 | −0.692 | −1.870 | −0.599 | −0.442 | −0.447 | −0.457 |
| (12) | νL11P1 | 81.540 | 95.100 | 81.540 | 67.000 | 81.540 | 95.100 | 95.100 |
| (13) | νL12N1 | 44.270 | 39.680 | 46.530 | 44.270 | 42.740 | 44.270 | 44.270 |
| (14) | d11/T1 | 0.798 | 0.754 | 0.744 | 0.539 | 0.535 | 0.686 | 0.609 |

Image Pickup Apparatus

Figure 15:
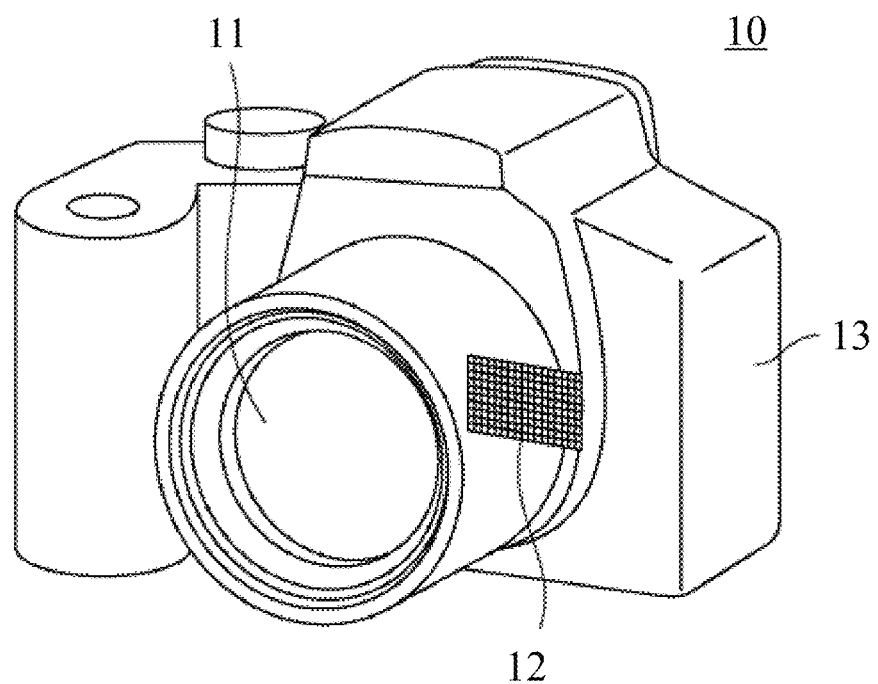
FIG. 15 is a schematic view of an image pickup apparatus.

Referring now to FIG. 15, a description will be given of an example of a digital still camera (image pickup apparatus) 10 using the optical system according to one aspect of the embodiments for the imaging optical system. In FIG. 15, reference numeral 11 denotes an imaging optical system including any one of the zoom lenses described in Examples 1 to 7. Reference numeral 12 denotes an image sensor (photoelectric conversion element) such as a CCD sensor and a CMOS sensor, which is built in a camera body 13, receives an optical image formed by the imaging optical system 11, and performs a photoelectric conversion. The camera body 13 may be a so-called single-lens reflex camera having a quick turn mirror, or a so-called mirrorless camera having no quick turn mirror.

The zoom lens according to one aspect of the embodiments thus applied to an image pickup apparatus such as a digital still camera can provide an image pickup apparatus having a small lens.

Each example can provide a compact and lightweight zoom lens having a long focal length, a large aperture ratio, and a high image quality.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A zoom lens comprising, in order from an object side to an image side:
   a first lens unit having a positive refractive power;
   an intermediate unit having two lens units; and
   a rear group having a positive refractive power as a whole and including one or more lens units,
   wherein a distance between adjacent lens units changes during zooming,
   wherein the intermediate unit consists of an intermediate lens unit and a second lens unit having a negative power,
   wherein the first lens unit consists of a first subunit having a positive refractive power and a second subunit disposed on the image side of the first subunit,
   wherein the first subunit and the second subunit are separated by largest interval in the first lens unit,
   wherein the first subunit consists of a first positive lens,
   wherein the second subunit includes a second positive lens and a first negative lens,
   wherein a lens unit closest to the image side in the rear group includes a positive lens and a plurality of negative lenses,
   wherein the first lens unit is fixed during focusing, and
   wherein the following inequalities are satisfied:

$$-8.0 < f1/f2 < -2.5$$

where f1 is a focal length of the first lens unit, and f2 is a focal length of the second lens unit.

2. The zoom lens according to claim 1, wherein the following inequality is satisfied:

$$0.9 < \Sigma f11/|f11i| < 1.2$$

where f11i is a focal length of an i-th lens counted from the object side of the first subunit.

3. The zoom lens according to claim 1, wherein the following inequality is satisfied:

$$0.1 < (r2+r1)/(r2-r1) < 2.0$$

where r1 is a radius of curvature of a surface on the object side of the first positive lens, and r2 is a radius of curvature of a surface on the image side of the first positive lens.

4. The zoom lens according to claim 1, wherein the following inequality is satisfied:

$$0.3 < (D1t-D1w)/|f2| < 2.0$$

where D1t is a distance on an optical axis from the first lens unit to the second lens unit at a telephoto end, and D1w is a distance on the optical axis from the first lens unit to the second lens unit at a wide-angle end.

5. The zoom lens according to claim 1, wherein the following inequality is satisfied:

$$0.39 < Lt/ft < 1.20$$

where Lt is a distance on an optical axis from a lens surface closest to an object of the first lens unit at a telephoto end to an image plane, and ft is a focal length of the zoom lens at the telephoto end.

6. The zoom lens according to claim 1, wherein the following inequality is satisfied:

$$0.2 < (T1+D1t)/ft < 0.9$$

where T1 is a distance on an optical axis from a lens surface closest to an object of the first lens unit to a lens surface closest to an image plane of the first lens unit, D1t is a distance on the optical axis from the first lens unit to the second lens unit at a telephoto end, and ft is a focal distance of the zoom lens at the telephoto end.

7. The zoom lens according to claim 1, wherein the following inequality is satisfied:

$$0.10 < (T1+D1w)/fw < 0.95$$

where T1 is a distance on an optical axis from a lens surface closest to an object of the first lens unit to a lens surface closest to an image plane of the first lens unit, D1w is a distance on the optical axis from the first lens unit to the second lens unit at a wide-angle end, and fw is a focal length of the zoom lens at a wide-angle end.

8. The zoom lens according to claim 1, wherein the following inequality is satisfied:

$$0.25 < f1/ft < 1.20$$

where ft is a focal length of the zoom lens at a telephoto end.

9. The zoom lens according to claim 1, wherein the following inequality is satisfied:

$$-5.0 < \beta 2w < -0.1$$

where $\beta 2w$ is an imaging lateral magnification of the second lens unit at a wide-angle end.

10. The zoom lens according to claim 1, wherein the following inequality is satisfied:

$$60 < \nu L11P1 < 100$$

where $\nu L11P1$ is an Abbe number of the first positive lens for d-line.

11. The zoom lens according to claim 1, wherein the following inequality is satisfied:

$$30 < \nu L12N1 < 60$$

where $\nu L12N1$ is an Abbe number of the first negative lens for d-line.

12. The zoom lens according to claim 1, wherein the following inequality is satisfied:

$$0.3 < d11/T1 < 0.95$$

where d11 is a distance on an optical axis from the first subunit to the second subunit, and T1 is a distance on an optical axis from a lens surface closest to an object of the first lens unit to a lens surface closest to an image plane of the first lens unit.

13. The zoom lens according to claim 1, wherein the first subunit includes, in order from the object side to the image side, the first positive lens, and a lens having a positive or negative refractive power.

14. The zoom lens according to claim 1, wherein the second subunit includes three lenses or less.

15. The zoom lens according to claim 1, wherein the following inequality is satisfied:

$$0.10 < d11/f1 < 0.50$$

where d11 is a distance on an optical axis from the first subunit to the second subunit, and f11 is a focal length of the first subunit.

16. The zoom lens according to claim 1, wherein the following inequality is satisfied:

$$0.6 < f11/f1 < 2.0$$

where f11 is a focal length of the first subunit.

17. An image pickup apparatus comprising:
a zoom lens; and
an image sensor configured to receive an image formed by the zoom lens, wherein the zoom lens comprising, in order from an object side to an image side:
a first lens unit having a positive refractive power;
an intermediate unit having two lens units; and
a rear group having a positive refractive power as a whole and including one or more lens units,
wherein a distance between adjacent lens units changes during zooming,
wherein the intermediate unit consists of an intermediate lens unit and a second lens unit having a negative power,
wherein the first lens unit consists of a first subunit having a positive refractive power and a second subunit disposed on the image side of the first subunit,
wherein the first subunit and the second subunit are separated by largest interval in the first lens unit,
wherein the first subunit includes a first positive lens,
wherein the second subunit includes a second positive lens and a first negative lens,
wherein a lens unit closest to the image side in the rear group includes a positive lens and a plurality of negative lenses,
wherein the first lens unit is fixed during focusing, and
wherein the following inequalities are satisfied:

$$-8.0 < f1/f2 < -2.5$$

where f1 is a focal length of the first lens unit, and f2 is a focal length of the second lens unit.

18. The zoom lens according to claim 1, wherein the intermediate unit consists of intermediate lens unit and the second lens unit, arranged in order from the object side to the image side.

19. The zoom lens according to claim 1, wherein the following inequality is satisfied:

$$0.08 < d11/f11 < 0.50$$

$$0.6 < f11/f1 < 2.0$$

where d11 is a distance on an optical axis from the first subunit to the second subunit, and f11 is a focal length of the first subunit.

20. The zoom lens according to claim 1, wherein the following inequality is satisfied:

$$0.08 < d11/f11 \leq 0.245$$

$$-4.899 \leq f1/f2 < -2.5$$

where d11 is a distance on an optical axis from the first subunit to the second subunit, and f11 is a focal length of the first subunit.

21. A zoom lens comprising, in order from an object side to an image side:
a first lens unit having a positive refractive power;
an intermediate unit having two lens units; and
a rear group having a positive refractive power as a whole and including one or more lens units,
wherein a distance between adjacent lens units changes during zooming,
wherein the intermediate unit consists of an intermediate lens unit and a second lens unit having a negative power,
wherein the first lens unit consists of a first subunit having a positive refractive power and a second subunit disposed on the image side of the first subunit,
wherein the first subunit and the second subunit are separated by largest interval in the first lens unit,
wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$0.3 < (D1t - D1w)/|f2| < 2.0$$

where f1 is a focal length of the first lens unit, f2 is a focal length of the second lens unit, D1$t$ is a distance on an optical axis from the first lens unit to the second lens unit at a telephoto end, and D1$w$ is a distance on the optical axis from the first lens unit to the second lens unit at a wide-angle end.

22. A zoom lens comprising, in order from an object side to an image side:

a first lens unit having a positive refractive power;
an intermediate unit having two lens units; and
a rear group having a positive refractive power as a whole and including one or more lens units, wherein a distance between adjacent lens units changes during zooming, wherein the intermediate unit consists of an intermediate lens unit and a second lens unit having a negative power, wherein the first lens unit consists of a first subunit having a positive refractive power and a second subunit disposed on the image side of the first subunit, wherein the first subunit and the second subunit are separated by largest interval in the first lens unit, wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$0.39 < Lt/ft < 1.20$$

where f1 is a focal length of the first lens unit, f2 is a focal length of the second lens unit, Lt is a distance on an optical axis from a lens surface closest to an object of the first lens unit at a telephoto end to an image plane, and ft is a focal length of the zoom lens at the telephoto end.

23. A zoom lens comprising, in order from an object side to an image side:

a first lens unit having a positive refractive power;
an intermediate unit having two lens units; and
a rear group having a positive refractive power as a whole and including one or more lens units, wherein a distance between adjacent lens units changes during zooming, wherein the intermediate unit consists of an intermediate lens unit and a second lens unit having a negative power, wherein the first lens unit consists of a first subunit having a positive refractive power and a second subunit disposed on the image side of the first subunit, wherein the first subunit and the second subunit are separated by largest interval in the first lens unit, wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$0.2 < (T1 + D1t)/ft < 0.9$$

where f1 is a focal length of the first lens unit, f2 is a focal length of the second lens unit, T1 is a distance on an optical axis from a lens surface closest to an object of the first lens unit to a lens surface closest to an image plane of the first lens unit, D1$t$ is a distance on the optical axis from the first lens unit to the second lens unit at a telephoto end, and ft is a focal distance of the zoom lens at the telephoto end.

24. A zoom lens comprising, in order from an object side to an image side:

a first lens unit having a positive refractive power;
an intermediate unit having two lens units; and
a rear group having a positive refractive power as a whole and including one or more lens units, wherein a distance between adjacent lens units changes during zooming, wherein the intermediate unit consists of an intermediate lens unit and a second lens unit having a negative power, wherein the first lens unit consists of a first subunit having a positive refractive power and a second subunit disposed on the image side of the first subunit, wherein the first subunit and the second subunit are separated by largest interval in the first lens unit, wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$0.10 < (T1 + D1w)/fw < 0.95$$

where f1 is a focal length of the first lens unit, f2 is a focal length of the second lens unit, T1 is a distance on an optical axis from a lens surface closest to an object of the first lens unit to a lens surface closest to an image plane of the first lens unit, D1$w$ is a distance on the optical axis from the first lens unit to the second lens unit at a wide-angle end, and fw is a focal length of the zoom lens at a wide-angle end.

25. A zoom lens comprising, in order from an object side to an image side:

a first lens unit having a positive refractive power;
an intermediate unit having two lens units; and
a rear group having a positive refractive power as a whole and including one or more lens units, wherein a distance between adjacent lens units changes during zooming, wherein the intermediate unit consists of an intermediate lens unit and a second lens unit having a negative power, wherein the first lens unit consists of a first subunit having a positive refractive power and a second subunit disposed on the image side of the first subunit, wherein the first subunit and the second subunit are separated by largest interval in the first lens unit, wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$-5.0 < \beta 2w < -0.1$$

where f1 is a focal length of the first lens unit, f2 is a focal length of the second lens unit, and $\beta 2w$ is an imaging lateral magnification of the second lens unit at a wide-angle end.

26. A zoom lens comprising, in order from an object side to an image side:

a first lens unit having a positive refractive power;

an intermediate unit having two lens units; and a rear group having a positive refractive power as a whole and including one or more lens units, wherein a distance between adjacent lens units changes during zooming, wherein the intermediate unit consists of an intermediate lens unit and a second lens unit having a negative power, wherein the first lens unit consists of a first subunit having a positive refractive power and a second subunit disposed on the image side of the first subunit, wherein the first subunit and the second subunit are separated by largest interval in the first lens unit, wherein the first subunit consists of a first positive lens, wherein the second subunit includes a second positive lens and a first negative lens, wherein a lens unit closest to the image side in the rear group includes a positive lens and a plurality of negative lenses, wherein the first lens unit is fixed during focusing, and wherein the following inequalities are satisfied:

$$-8.0 < f1/f2 < -2.5$$

$$0.3 < d11/T1 < 0.95$$

where f1 is a focal length of the first lens unit, f2 is a focal length of the second lens unit, d11 is a distance on an optical axis from the first subunit to the second subunit, and T1 is a distance on an optical axis from a lens surface closest to an object of the first lens unit to a lens surface closest to an image plane of the first lens unit.

* * * * *